(12) United States Patent
Wakeley et al.

(10) Patent No.: US 6,463,498 B1
(45) Date of Patent: Oct. 8, 2002

(54) TRANSMISSION OF FCP RESPONSE IN THE SAME LOOP TENANCY AS THE FCP DATA WITH MINIMIZATION OF INTER-SEQUENCE GAP

(75) Inventors: Matthew P Wakeley; Bryan J Cowger, both of Roseville, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,970

(22) Filed: Oct. 30, 1998

(51) Int. Cl.[7] .......................... G06F 13/14; H04L 12/40

(52) U.S. Cl. .................. 710/309; 710/315; 710/52; 709/250; 370/464

(58) Field of Search .................................. 710/309, 315, 710/105, 260, 5, 62, 52, 305; 709/236, 238, 250, 249; 359/118; 370/401, 447, 464, 466, 395.5

(56) References Cited

U.S. PATENT DOCUMENTS

| | | | | |
|---|---|---|---|---|
| 5,727,218 | A | * | 3/1998 | Hotchkin |
| 5,809,328 | A | * | 9/1998 | Nogales et al. |
| 6,209,023 | B1 | * | 3/2001 | Dimitroff et al. |
| 6,314,477 | B1 | * | 11/2001 | Cowger et al. |

* cited by examiner

*Primary Examiner*—Gopal C. Ray

(57) ABSTRACT

A method and system for efficiently executing a read operation received from an initiator node by an interface controller within a communication network port. The host processor associated with the communications port provides both data to return to the initiator through the communications network as well as a response message to be returned to the initiator through the communications network by the communication network port in one operation. The communication network port can then send both the data and the completion message to the initiator following a single operation for gaining control of the communications network and without a lapse of time between sending the data and sending the completion message.

10 Claims, 36 Drawing Sheets

| INITIATOR | | | TARGET |
|---|---|---|---|
| STATE | | | STATE |
| BUS FREE 646 | | | BUS FREE |
| ARBITRATION 648 | | ASSERT BSY AND DX ASSERT SEL AND I/O | ARBITRATION |
| RESELECTION 650 | | ASSERT DX AND ATN DROP SEL | RESELECTION |
| MESSAGE IN 652 | | IDENTIFY [ LUN ] ⟵ 654 | MESSAGE IN |
| MESSAGE IN | | QUEUE TAG MESSAGE [ SIMPLE QUEUE TAG | QUEUE TAG ] ⟵ 656 | MESSAGE IN |
| DATA IN (READ) OUT (WRITE) 658 | ACK | DATA ⟶ WRITE ⟵ READ | REQ ooo | DATA IN (READ) OUT (WRITE) |
| OPTIONAL DISCONNECT/ RECONNECT 660 | MESSAGE IN | SAVE POINTERS ⟵ | MESSAGE IN | OPTIONAL DISSCONNECT/ RECONNECT |
| | MESSAGE IN | DISCONNECT ⟵ | MESSAGE IN | |
| | BUS FREE | | BUS FREE | |
| | ARBITRATION | | ARBITRATION | |
| | RESELECTION | | RESELECTION | |
| | MESSAGE IN | IDENTIFY ⟵ | MESSAGE IN | |
| | MESSAGE IN | QUEUE TAG MESSAGE ⟵ | MESSAGE IN | |
| DATA | ACK | DATA ⟶ WRITE ⟵ READ | REQ ooo | DATA |
| MESSAGE IN 662 | | DISCONNECT ⟵ | MESSAGE IN |
| BUS FREE 664 | | DROP BSY | BUS FREE |

FIG.6B

| INITIATOR | | TARGET | |
|---|---|---|---|
| STATE | | | STATE |
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | IDENTIFY LUN ← 674 | | MESSAGE IN |
| MESSAGE IN | QUEUE TAG MESSAGE SIMPLE QUEUE TAG / QUEUE TAG ← 676 | | MESSAGE IN |
| STATUS 678 | 00h ← 680 | | STATUS |
| MESSAGE IN 682 | COMMAND COMPLETE 00h ← 684 | | MESSAGE IN |
| BUS FREE 686 | | DROP BSY | BUS FREE |

FIG.6C

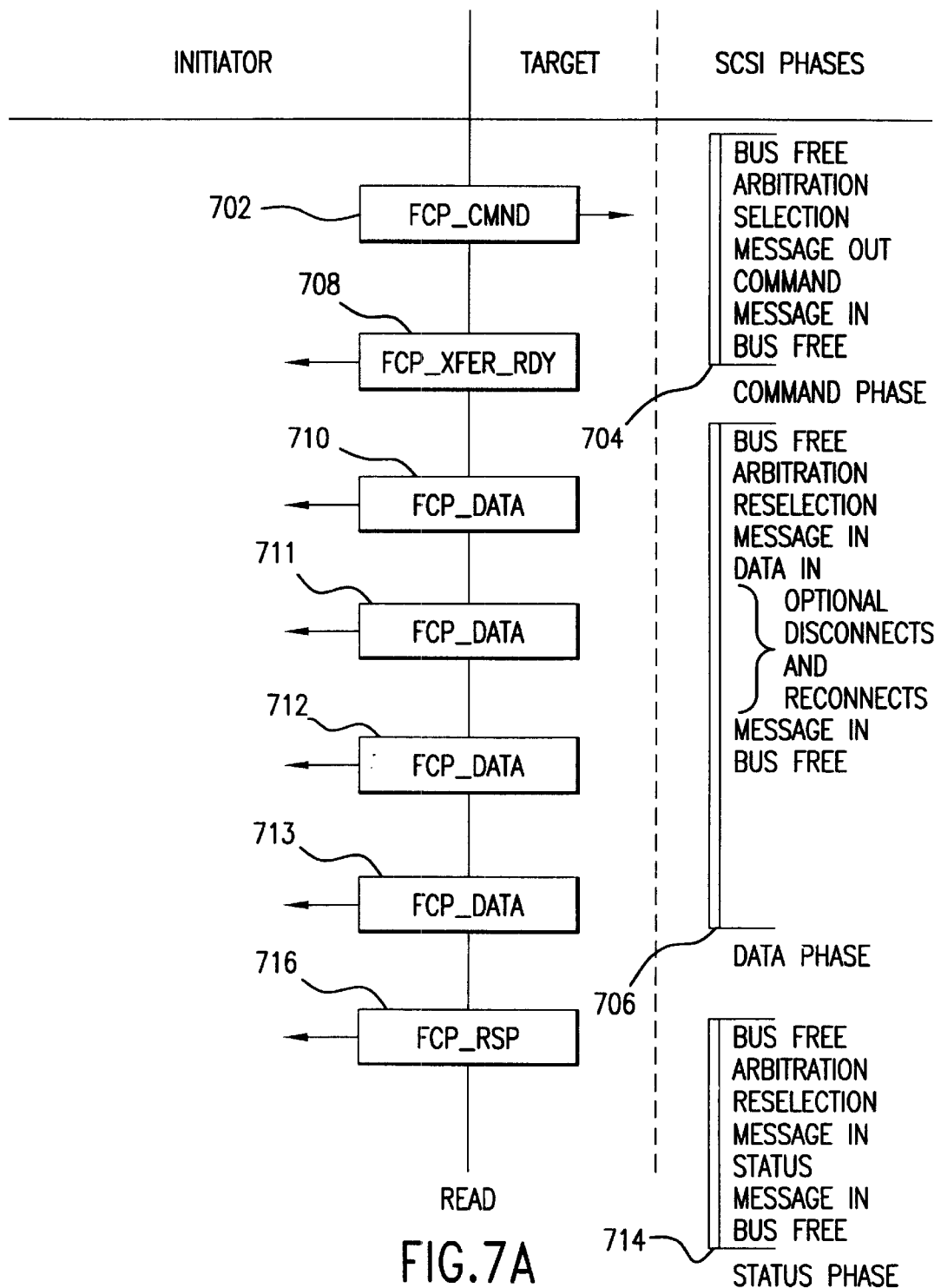

OUTBOUND DESCRIPTOR BACK

| DWORD | 31 ... 15 ... 0 |
|---|---|
| DWORD 0 | FCP \| END \| DCM \| DIN \| FRAME_LEN \| RESERVED \| HDR_LEN |
| DWORD 1 | HDR_ADDR |
| DWORD 2 | REMOTE_NODE_ID \| RSP_LEN |
| DWORD 3 | RSP_ADDR |
| DWORD 4 | LOC \| EECR \| RESERVED \| BUFF_OFF |
| DWORD 5 | BUFF_INDEX \| RESERVED |
| DWORD 6 | INV \| CTS \| LCK \| ROV \| DNC \| BPV \| SUR \| BRD \| RPV \| RESERVED \| RX_ID |
| DWORD 7 | TOTAL LENGTH |
| DWORD 8 | RO |
| DWORD 9 | SPC \| DPC \| RPC \| SPE \| Res \| FTD \| RESERVED \| SEST INDEX |
| DWORD A | EXTENDED GATHER LIST ADDRESS-UPPER(EGLAU)/LOCAL BUFFER ADDRESS-UPPER(LBAU) \| LOCAL BUFFER LENGTH |
| DWORD B | EXTENDED GATHER LIST ADDRESS-LOWER(EGLAL)/LOCAL BUFFER ADDRESS-LOWER(LBAL) |
| DWORD C | CURRENT GL PAGE ADDRESS-UPPER(CUR_PAGE_U)/LOCAL BUFFER ADDRESS-UPPER(LBAU) \| LOCAL BUFFER LENGTH |
| DWORD D | CURRENT GL PAGE ADDRESS-LOWER(CUR_PAGE_L)/LOCAL BUFFER ADDRESS-LOWER(LBAL) |
| DWORD E | LOCAL BUFFER ADDRESS-UPPER (LBAU) \| LOCAL BUFFER LENGTH |
| DWORD F | LOCAL BUFFER ADDRESS - LOWER (LBAL) |

FIG.28A

| DWORD/BIT | SYMBOL | DESCRIPTION |
|---|---|---|
| 0/31 | FCP | FCP: THE FCP BIT IS SET TO 1 TO INDICATE THAT THIS ODB IS FROM THE SCSI EXCHANGE MANAGER OUTBOUND FSM. |
| 0/30 | END | END BIT: THE END BIT IS SET TO 1 TO INDICATE THAT THE ENTIRE SEQUENCE IS CONTAINED IN THE HDR_LEN/HDR_ADDR PAIR. WHEN THE END BIT IS SET, IT IS REQUIRED THAT THE HEADER L/A PAIR DESCRIBES AN SFS. |
| 0/29 | DCM | DISABLE COMPLETION MESSAGE: THE DCM BIT IS SET TO 1 TO DISABLE THE OUTBOUND COMPLETION MESSAGE FOR THIS ODB (UNLESS AN ERROR OCCURS) |
| 0/28 | DIN | DISABLE INTERRUPT: THE DIN BIT IS SET TO 1 TO DISABLE THE INTERRUPT FROM BEING GENERATED WHEN THE OUTBOUND COMPLETION MESSAGE FOR THIS ODB IS PLACED ONTO THE IMQ. |
| 0/27..16 | FRAME_LEN | FRAME LENGTH: SPECIFIES THE LARGEST DATA_FIELD SIZE TO BE USED WHEN SENDING FT_1 FRAMES (SEE FC_PH SECTION 17.4) FOR THIS SEQUENCE REQUEST AS PROVIDED BY THE LOGIN PARAMETERS RECEIVED. |
| 0/15..12 | RESERVED | THIS FIELD IS RESERVED AND MUST BE CLEARED TO 0. |
| 0/11..0 | HDR_LEN | HEADER LENGTH: THE LENGTH OF THE FIBRE CHANNEL HEADER STRUCTURE, ANY OPTIONAL FIBRE CHANNEL HEADERS AND ANY OPTIONAL PAYLOAD NOT SPECIFIED IN THE GATHER LIST. HDR_LEN MUST BE AT LEAST 32 BYTES AND MUST BE LESS THAN OR EQUAL TO FRAME_LEN+32. HDR_LEN MUST BE A MULTIPLE OF 4 BYTES IF THE END BIT IS CLEAR, OTHERWISE IT MAY BE ANY MULTIPLE OF A BYTE. |
| 1/31..0 | HDR_ADDR | HEADER ADDRESS: THE ADDRESS OF THE FIBRE CHANNEL HEADER STRUCTURE, ANY OPTIONAL FIBRE CHANNEL HEADERS AND ANY OPTIONAL PAYLOAD NOT SPECIFIED IN THE GATHER LIST. |
| 2/31..8 | REMOTE_NODE_ID | REMOTE NODE IDENTIFIER: THE INDENTIFIER OF THE NODE THAT THE SEQUENCE IS TO BE SENT TO. |
| 2/7..0 | RSP_LEN | RESPONSE LENGTH: THE LENGTH TO THE FCP RESPONSE FRAME FOR THE TARGET AUTO STATUS MODE. |
| 3/31..0 | RSP_ADDR | RESPONSE ADDRESS: THE ADDRESS TO THE FCP RESPONSE FRAME FOR THE TARGET AUTO STATUS MODE. |
| 4/31 | LOC | LOCAL GATHER LIST: THE LOC BIT IS SET TO 1 TO INDICATE THAT THE GATHER LIST FOR THIS SEQUENCE IS CONTAINED WITHIN THE ODB IN DWORDS A-F. THE LOC BIT IS CLEARED TO 0 TO INDICATE THAT AND EXTENDED GATHER LIST IS TO BE USED FOR THIS SEQUENCE. |
| 4/30..27 | EECR | EE CREDIT: THE EE_CREDIT (DISCOVERED DURING LOGIN) TO BE USED TO SEND THIS SEQUENCE. THE MAXIMUM EE_CREDIT IS 15. ZERO IS ILLEGAL. CLASS 3 SEQUENCES SHOULD SET THIS VALUE TO 15. |
| 4/26..19 | RESERVED | THIS FIELD IS RESERVED AND MUST BE CLEARED TO 0. |
| 4/18..0 | BUFF_OFF | GATHER LIST BUFFER OFFSET: THE OFFSET WITHIN THE L/A BUFFER SPECIFIED BY BUFF_IND OF THE DATA TO BE SENT. |
| 5/31..16 | BUFF_IND | GATHER LIST INDEX: THE INDEX TO THE L/A PAIR TO BEGIN SENDING DATA FROM. L/A PAIRS ARE NUMBERED STARTING FROM ZERO. |
| 5/15..0 | RESERVED | THIS FIELD IS RESERVED AND MUST BE CLEARED TO 0. |

FIG.28B

| | | |
|---|---|---|
| 6/31 | INV | INVALID: THE INV BIT IS SET TO 1 TO INDICATE THAT THIS ODB IS INVALID THE SEQUENCE DESCRIBED BY THIS SEQUENCE IS NOT SENT. AN OUTBOUND COMPLETION MESSAGE IS SENT TO THE HOST WITH THE HPE BIT SET WHEN THE INV BIT IS SET. |
| 6/30 | CTS | CONTINUE SEQUNCE: THE CTS BIT IS SET TO 1 TO INDICATE THAT THIS SEQUENCE IS NOT TO HAVE THE END OF SEQUENCE INDICATORS SET. (I.E. THE END OF SEQUENCE BIT IN THE F_CTL FIELD OF THE LAST FRAME OF THE SEQUENCE IS NOT SET NOR IS THE EOFT DELIMITER APPENDED TO THE LAST FRAME OF CLASS 3 SEQUENCES.) THE CTS BIT IS CLEARED TO 0 TO INDICATE THAT THE SEQUENCE IS TO BE NORMALLY TERMINATED. |
| 6/29 | RESERVED | THIS FIELD IS RESERVED AND MUST BE CLEARED TO 0. |
| 6/28 | ROV | R_CTL OVERRIDE: WHEN SET, OSM WILL SET THE R_CTL FIELD OF THE FC HEADER TO "SOLICITED DATA". OSM WILL ALSO USED THE RO FIELD DEFINED IN THE ODB RATHER THAN THE ONE DEFINED IN THE FC HEADER. OSM WILL ALSO USE THE RX_ID FROM THE ODB RATHER THAN THE ONE IN THE FC HEADER. OSM WILL ALSO CLEAR THE FIRST SEQUENCE OF EXCHANGE BIT IN THE F_CTL FIELD OF EVERY FRAME OF THE SEQUENCE. ONLY VALID FOR AN IWE. |
| 6/27 | DNC | DO NOT CLOSE: WHEN SET, INSTRUCTS OSM TO RETAIN LOOP TENANCY AT THE END OF THE FIRST SEQUENCE-ANOTHER SEQUENCE TO THE SAME D_ID IS IMMEDIATELY FOLLOWING. THE DNC BIT ONLY APPLIES TO THE FIRST SEQUENCE DEFINED BY THE ODB, THAT IS, IF THE BPV BIT IS SET, THEN THE LOOP IS NOT CLOSED AFTER THE FIRST SEQUENCE, BUT IS ALWAYS CLOSED AFTER THE SECOND SEQUENCE. USED FOR SENDING THE FCP_RSP FRAME ON THE SAME LOOP TENANCY AS THE TARGET IN A TARGET SCSI READ OPERATION. |
| 6/26 | BPV | BOTH L/A PAIRS VALID: SEM_OUT SETS THIS BIT WHEN BOTH THE HDR L/A PAIR AND THE RSP L/A PAIR ARE VALID. WHEN BOTH L/A'S ARE VALID OSM SENDS THE FRAME DEFINED BY THE RSP L/A PAIR AFTER THE SEQUENCE DEFINED IN PART BY THE HDR L/A PAIR. WHENEVER THE BPV BIT IS SET, DNC SHALL ALSO BE SET. |
| 6/25 | SUR | SEQUENCE UPDATE REQUEST: SEM_OUT SETS THIS BIT TO 1 IF IT DESIRES A SEQUENCE UPDATE FROM OSM AT THE END OF PROCESSING THIS ODB. |
| 6/24 | BRD | SEND SEQUENCE TO BROADCAST AL_PA: THIS BIT IS SET TO CAUSE OSM TO PUT THE "BROADCAST" AL_PA IN THE SOF WORD, CAUSING THIS SEQUENCE TO BE SENT TO THE BROADCAST AL_PA. |
| 6/23 | RPV | RESPONSE PAIR VALID: SEM_OUT SETS THIS BIT WHEN THE RSP L/A IS VALID. WHEN THE RPV BIT IS SET AND THE BPV BIT IS NOT, OSM WILL SEND THE FRAME THAT IS DESCRIBED BY THE RSP L/A PAIR-HDR L/A PAIR IS NOT VALID. THIS BIT IS NOT MEANINGFUL WHEN THE BPV BIT IS SET. |
| 6/22..16 | RESERVED | THIS FIELD IS RESERVED AND MUST BE CLEARED TO 0. |
| 6/15..0 | RX_ID | RESPONDER EXCHANGE INDENTIFIER: THE RX_ID THAT IS TO BE USED WHEN SENDING THE FCP_DATA SEQUENCE. ONLY VALID IF ROV IS SET TO 1. |
| 7/31..0 | TOT_LEN | TOTAL SEQUENCE LENGTH: LENGTH OF THE DATA TO SEND. THIS LENGTH DOES NOT INCLUDE THE LENGTH OF THE FIBRE CHANNEL HEADER STRUCTURE, BUT DOES INCLUDE OPTIONAL FC HEADERS USED. UNITS ARE IN BYTES. THE TOT_LEN FIELD MUST BE EQUAL TO OR GREATER THAN HDR_LEN-32. |

FIG.28C-1

| 8/31..0 | RO | RELATIVE OFFSET: THE RO TO BE USED WHEN SENDING THE FIRST FRAME OF THIS SEQUENCE. OSM INCREMENTS THIS FOR SUBSEQUENT FRAMES. OSM SHALL USE THIS RO ONLY WHEN THE ROV BIT IS SET. WHEN THE ROV BIT IS NOT SET, THE RO WILL BE TAKEN FROM THE FC HEADER. |
|---|---|---|

FIG.28C-2

| | | |
|---|---|---|
| 9/31 | SPC | SFS PHASE COMPLETE: SEM_OUT SETS THIS BIT TO 1 FOR ANY SFS. OSM INCLUDES THIS BIT IN ANY COMPLETION MESSAGE GENERATED. |
| 9/30 | DPC | DATA PHASE COMPLETE: SEM_OUT SETS THIS BIT TO 1 FOR ANY DATA PHASE SEQUENCE. OSM INCLUDES THIS BIT IN ANY COMPLETION MESSAGE GENERATED. |
| 9/29 | RPC | RESPONSE PHASE COMPLETE: SEM_OUT SETS THIS BIT TO 1 FOR ANY RESPONSE PHASE SEQUENCE. OSM INCLUDES THIS BIT IN ANY COMPLETION MESSAGE GENERATED. |
| 9/28 | SPE | SEST PROGRAMMING ERROR: SEM_OUT SETS THIS BIT TO 1 IF IT DETECTS A SEST PROGRAMMING ERROR. OSM INCLUDES THIS BIT IN ANY COMPLETION MESSAGE GENERATED. |
| 9/27 | RESERVED | RESERVED: MUST BE CLEARED TO ZERO. |
| 9/26..25 | FTD | FCP TRANSACTION ID: SEM_OUT SET THIS FIELD TO CORRESPOND WITH THE PARTICULAR SEST BUFFER WITHIN SEM_OUT. CURRENTLY, THERE ARE ONLY 2 BUFFERS. ARCHITECTURALLY, WE CAN SUPPORT UPTO 4. |
| 9/24..16 | RESERVED | RESERVED: MUST BE CLEARED TO ZERO. |
| 9/15..0 | SEST INDEX | SEST INDEX: THE INDEX TO THE SEST TABLE THAT CORRESPONDS TO THE EXCHANGE THAT THIS ODB DEFINES. |
| A/31..19 | EGLAU/ LBAU | EXTENDED GATHER LIST ADDRESS - UPPER: WHEN AN EXTENDED GATHER LIST IS USED (LOC BIT IS ZERO), THIS FIELD CONTAINS THE UPPER 12 BITS OF THE ADDRESS OF THE START OF THE GATHER LIST. LOCAL BUFFER ADDRESS - UPPER: WHEN A LOCAL GATHER LIST IS USED (LOC BIT IS SET), THIS FIELD CONTAINS THE UPPER 13 BITS THE ADDRESS OF THE FIRST BUFFER |
| A/18..0 | LOCAL BUFFER LENGTH | LOCAL BUFFER LENGTH: WHEN A LOCAL GATHER LIST IS USED (THE LOC BIT IS SET), THIS FIELD CONTAINS THE LENGTH, IN BYTES, OF THE FIRST BUFFER. A LENGTH OF ZERO INDICATES THE END OF THE LIST. IF THE LOC BIT IS CLEAR, THIS FIELD IS RESERVED AND MUST BE CLEARED TO 0. |
| B/31..0 | EGLAL/ LBAL | EXTENDED GATHER LIST ADDRESS - LOWER: WHEN AN EXTENDED GATHER LIST IS USED (LOC BIT IS ZERO), THIS FIELD CONTAINS THE LOWER 32 BITS OF THE ADDRESS OF THE START OF THE GATHER LIST. LOCAL BUFFER ADDRESS - LOWER: WHEN A LOCAL GATHER LIST IS USED (LOC BIT IS SET), THIS FIELD CONTAINS THE LOWER 32 BITS THE ADDRESS OF THE FIRST BUFFER. |
| C/31..19 | LBAU | LOCAL BUFFER ADDRESS - UPPER: WHEN A LOCAL GATHER LIST IS USED (LOC BIT IS SET), THIS FIELD CONTAINS THE UPPER 13 BITS OF THE ADDRESS OF THE SECOND BUFFER. |
| C/18..0 | LOCAL BUFFER LENGTH | LOCAL BUFFER LENGTH: WHEN A LOCAL GATHER LIST IS USED (THE LOC BIT IS SET), THIS FIELD CONTAINS THE LENGTH, IN BYTES, OF THE SECOND BUFFER. A LENGTH OF ZERO INDICATES THE END OF THE LIST. IF THE LOC BIT IS CLEAR, THIS FIELD IS RESERVED AND MUST BE CLEARED TO 0. |
| D/31..0 | LBAL | LOCAL BUFFER ADDRESS - LOWER: WHEN A LOCAL GATHER LIST IS USED (LOC BIT IS SET), THIS FIELD CONTAINS THE LOWER 32 BITS THE ADDRESS OF THE SECOND BUFFER. IF THE LOC BIT IS CLEAR, THIS FIELD IS RESERVED AND MUST BE CLEARED TO 0. |

FIG.28D

| | | |
|---|---|---|
| E/31..19 | LBAU | LOCAL BUFFER ADDRESS – UPPER: WHEN LOCAL GATHER LIST IS USED (LOC BIT IS SET), THIS FIELD CONTAINS THE UPPER 13 BITS OF THE ADDRESS OF THE THIRD BUFFER.<br>IF THE LOC BIT IS CLEAR, THIS FIELD IS RESERVED AND MUST BE CLEARED TO 0. |
| E/18..0 | LOCAL BUFFER LENGTH | LOCAL BUFFER LENGTH: WHEN A LOCAL GATHER LIST IS USED (LOC BIT IS SET), THIS FIELD CONTAINS THE LENGTH, IN BYTES, OF THE THIRD BUFFER. A LENGTH OF ZERO INDICATES THE END OF THE LIST.<br>IF THE LOC BIT IS CLEAR, THIS FIELD IS RESERVED AND MUST BE CLEARED TO 0. |
| F/31..0 | LBAL | LOCAL BUFFER ADDRESS – LOWER: WHEN A LOCAL GATHER LIST IS USED (LOC BIT IS SET), THIS FIELD CONTAINS THE LOWER 32 BITS THE ADDRESS OF THE THIRD BUFFER.<br>IF THE LOC BIT IS CLEAR, THIS FIELD IS RESERVED AND MUST BE CLEARED TO 0. |

FIG. 28E

TRANSMISSION OF FCP RESPONSE IN THE SAME LOOP TENANCY AS THE FCP DATA WITH MINIMIZATION OF INTER-SEQUENCE GAP

TECHNICAL FIELD

The present invention relates to the improvement of communications network port performance and, in particular, to a method and system that decreases I/O latency and increases data throughput in communications network-based client/server mass storage solutions.

BACKGROUND OF THE INVENTION

The Fibre Channel ("FC") is an architecture and protocol for a data communication network for interconnecting a number of different combinations of computers and peripheral devices. The FC supports a variety of upper-level protocols, including the small computer systems interface ("SCSI") protocol. A computer or peripheral device is linked to the network through an FC Port and copper wires or optical fibres. An FC Port includes a transceiver and an interface controller, and the computer peripheral device in which the FC Port is contained is called a "host." The FC Port exchanges data with the host via a local data bus, such as a peripheral computer interface ("PCI") bus. The interface controller conducts lower-level protocol exchanges between the Fibre Channel and the computer or peripheral device in which the FC Port resides.

The FC is becoming increasingly important as a means to interconnect computers and peripheral storage devices. In such applications, an FC arbitrated loop topology is commonly employed. In an FC arbitrated loop, an FC node contends for control of the FC arbitrated loop and, upon gaining control, opens a channel to another FC node and exchanges data with that FC node in half-duplex or full-duplex mode. Peripheral mass storage devices commonly receive and respond to write and read commands from a host computer according to the SCSI protocol. Thus, in the common FC arbitrated loop topology for interconnecting host computers with peripheral mass storage devices, the host computer and peripheral mass storage devices exchange read and write commands and data through the SCSI protocol implemented on top of the Fibre Channel protocol.

A read operation may be initiated by a host computer, called an "initiator," and executed by a peripheral mass storage device, called a "target," which then returns the data requested in the read command back to the initiator. When the initiator and target communicate via the SCSI protocol mapped onto the FC protocol over an FC arbitrated loop topology, the issuance and execution of the read command involves three main phases. In the first phase, the initiator contends, or arbitrates, for control of the FC arbitrated loop and then sends the read command to the target. In the second phase, the target responds by arbitrating for FC arbitrated loop control and then sending the requested data back to the initiator. In the third phase, the target either maintains control of the FC arbitrated loop while preparing a final response sequence and then sends the response sequence back to the initiator, or the target surrenders control of the arbitrated loop, prepares a response sequence, again arbitrates for control of the FC arbitrated loop, and finally sends the response sequence back to the initiator. In the first alternative, the target blocks all other use of the FC arbitrated loop while it prepares the response sequence, and consequently, the throughput of the FC arbitrated loop is as a whole is degraded. In the second alternative, the target must arbitrate twice for FC arbitrated loop control in order to complete the read command, and thus the time for completion of the read command, or latency of the read command, is increased. FC port designers and manufacturers have therefore recognized the need to more intelligently execute SCSI read operations within the context of the FC arbitrated loop topology in order to avoid unnecessary degradation of FC arbitrated loop throughput and unnecessary increase in I/O command execution latency.

SUMMARY OF THE INVENTION

The present invention provides a Fibre Channel ("FC") interface controller for use in FC Ports interconnected by an FC arbitrated loop, that implements, in hardware, an efficient method for executing read commands in order to avoid unnecessary Fibre Channel throughput degradation and unnecessary increase in I/O latencies. In the improved method, the FC host containing an FC Port implemented with the improved interface controller of the present invention prepares a description of the data requested by a received read operation command into host memory buffers and assembles an FCP_Response sequence at the same time. The FC host then provides the improved interface controller with a data structure that includes references to the host memory buffers that contain the data requested by the read operation command and that also includes a reference to the description of the FCP_Response sequence. The FC Port implemented using the improved interface controller, upon receiving the data structure from the host, arbitrates for control of the FC arbitrated loop, returns the data requested by the read operation command to the initiator of the read operation command in an FC data sequence, and then immediately transmits to the initiator the already prepared FCP_Response sequence. By this method, the FC Port including the improved interface controller avoids arbitrating twice for control of the FC arbitrated loop in order to respond to the received read operation command and also avoids the increased I/O latency incurred by certain currently-available interface controllers when they return control to the host for preparation of the FCP_Response sequence. The improved interface controller transfers both the FCP data sequence and the FCP_Response sequence directly from host memory buffers to the Fibre Channel arbitrated loop, rather than unnecessarily storing and forwarding the FCP data sequence and FCP_Response sequence.

BRIEF DESCRIPTION OF THE DRAWINGS

FIGS. 6A–6C illustrate the SCSI protocol involved in the initiation and implementation of read and write I/O operations.

FIGS. 7A–7B illustrate a mapping of the FC Protocol to SCSI sequences exchanged between an initiator and target and the SCSI bus phases and states described in FIGS. 6A–6C.

FIGS. 28A, 28B, 28C–1, 28C–2, 28D and 28E illustrate RDB prepared internally by the TL in order to return both the FCP_DATA sequence and the FCP_RESPONSE sequence to the initiator following a single arbitration for control of the FC arbitrated loop.

DETAILED DESCRIPTION OF THE INVENTION

Figure 1A:
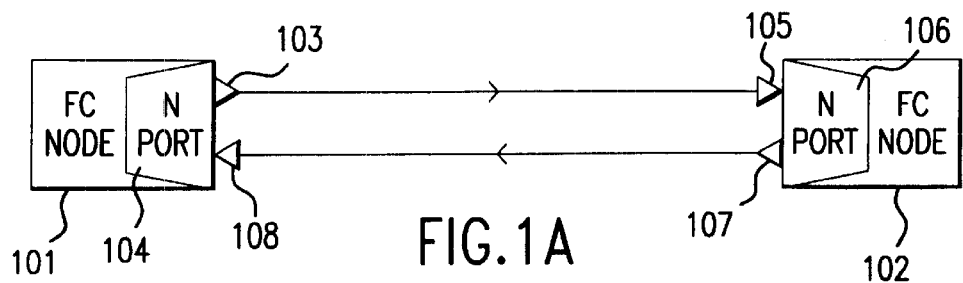
FIGS. 1A–1C shows the three different types of FC interconnection topologies.

The present invention will be described below in six subsections. The first three subsections provide greater detail about the Fibre Channel architecture and protocol, the SCSI architecture, and implementation of the SCSI protocol on top of the Fibre Channel protocol. The fourth subsection discusses the Fibre Channel arbitrated loop intialization process. The fifth subsection provides a general description of the present invention, and the sixth subsection provides an implementation of the present invention.

Fibre Channel

The Fibre Channel ("FC") is defined by, and described in, a number of ANSI Standards documents, including: (1). Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel, 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. FC standards documents may be found at the world wide web Internet page having the following address:

"http: //www. fibrechannel .com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or C more communications media. Communications media include shielded twisted pair connections, coaxial cable, and optical fibers. An FC node is connected to a communications medium via at least one FC Port and FC link. An FC Port is an FC host adapter or FC controller that shares a register and memory interface with the processing components of the FC node, and that implements, in hardware and firmware, the lower levels of the FC protocol. The FC node generally exchanges data and control information with the FC Port using shared data structures in shared memory and using control registers in the FC Port. The FC Port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
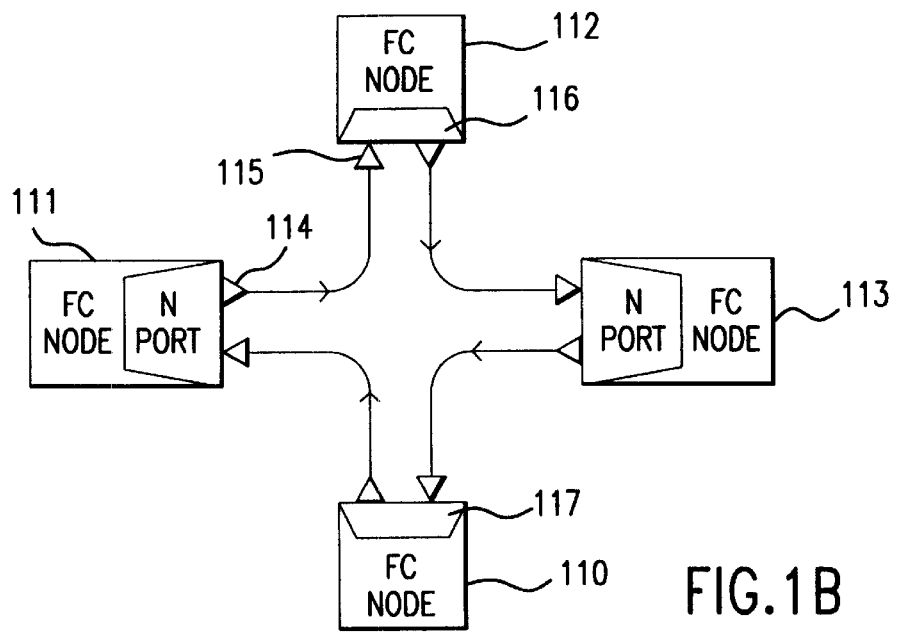
Figure 1C:
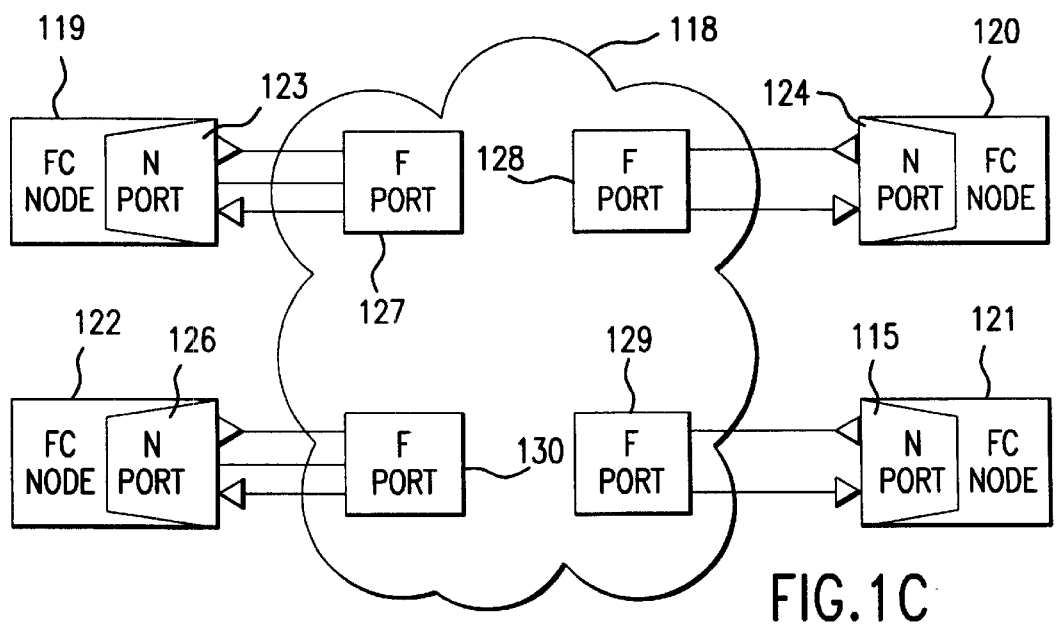

The FC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the FC Port 104 of the first node 101 to the receiver 105 of the FC Port 106 of the second node 102, and by directly connecting the transmitter 107 of the FC Port 106 of the second node 102 to the receiver 108 of the FC Port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC Ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional non-participating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119–122 are connected. The N_Ports 123–126 within the FC nodes 119–122 are connected to F_Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports. When optical fibers are employed, a single FC fabric can extend for ten kilometers. The FC can support interconnection of more than 16,000,000 FC nodes. A single FC host adapter can transmit and receive data at rates of up to 200 Mbytes per second. Much higher data exchange rates are planned for FC components in the near future.

Figure 2:
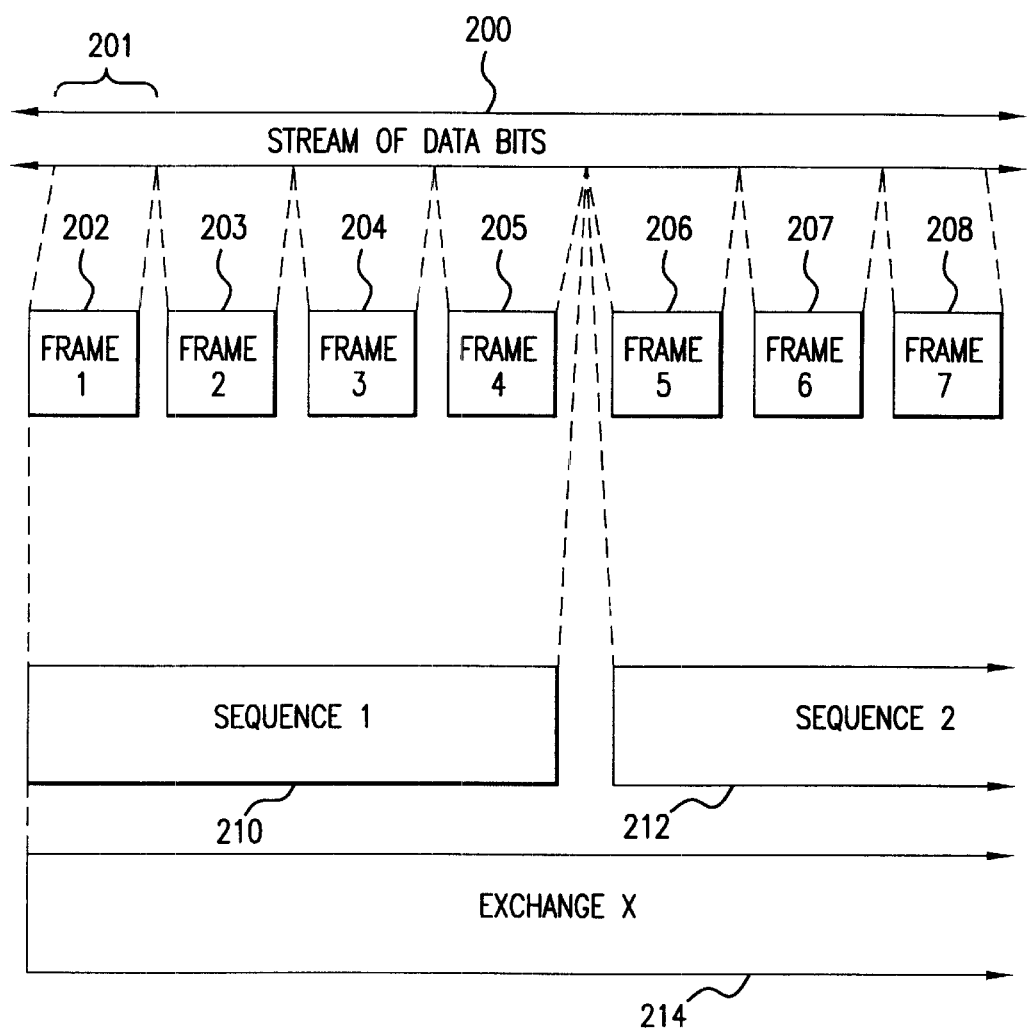
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-bit characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

Figure 3:
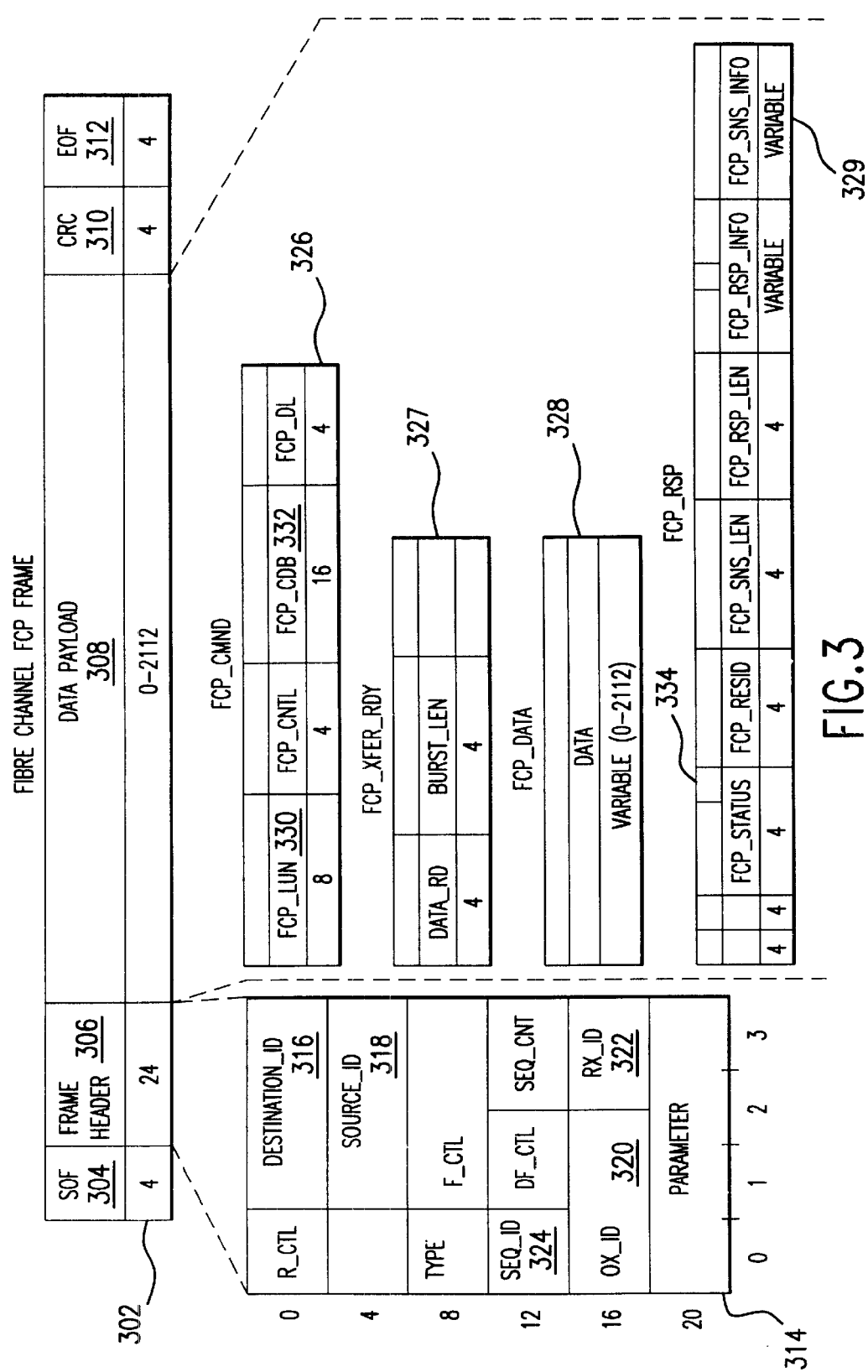
FIG. 3 shows the contents of a standard FC frame.

The FC is a full duplex data transmission medium. Frames and sequences can be simultaneously passed in both directions between an originator, or initiator, and a responder, or target. An exchange comprises all sequences, and frames within the sequences, exchanged, between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to Fibre Channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC. FIG. 3 shows the contents of a standard FC frame. The FC frame 302 comprises five high level sections 304, 306, 308, 310 and 312. The first high level section, called the start-of-frame delimitator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC Port for the frame. The source identifier ("S_ID"), or SOURCE_ID 318, is a 24-bit address that indicates the FC Port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC Ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter., and a logical unit number ("LUN") corresponding to a logical device associated with the specified target SCSI device that, together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution: of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
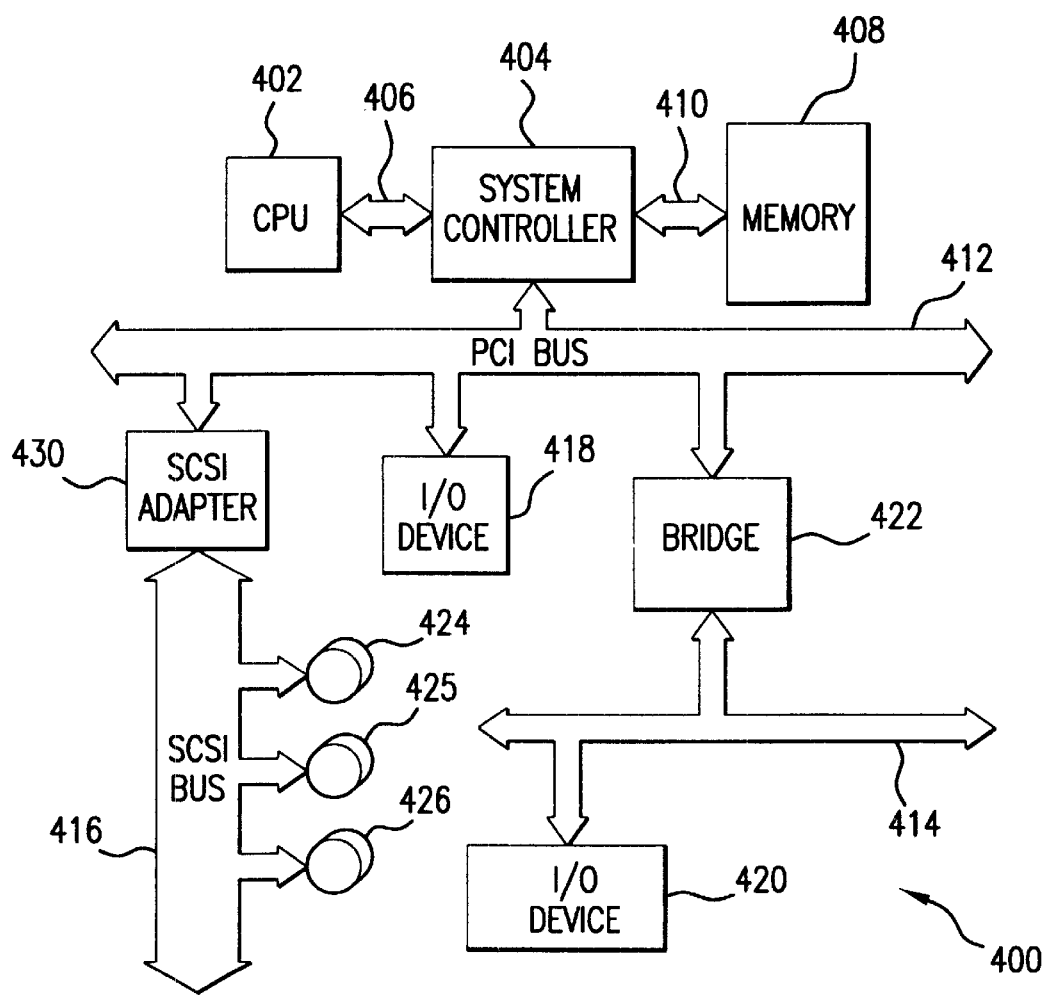
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
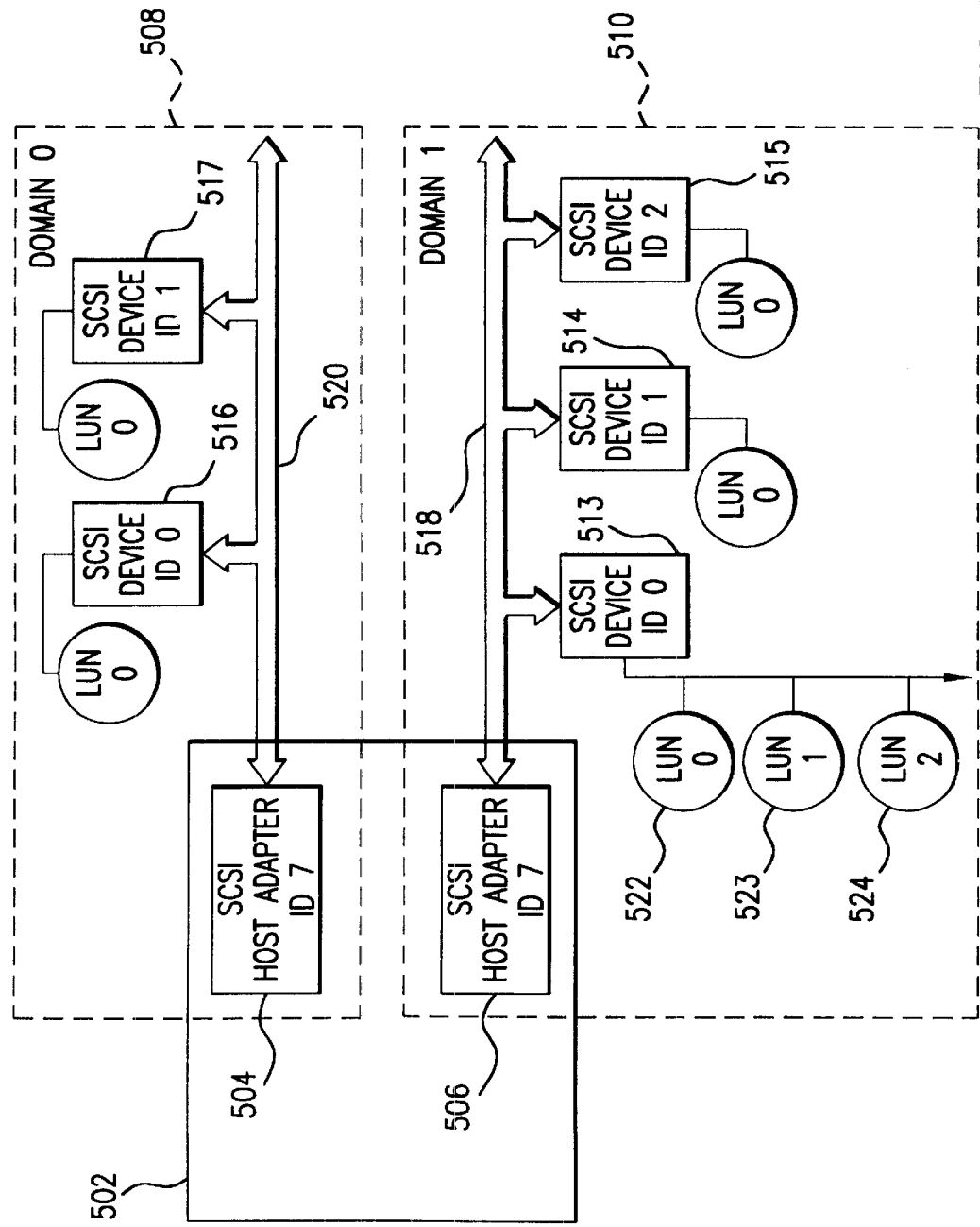
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/O commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

Figure 6A:
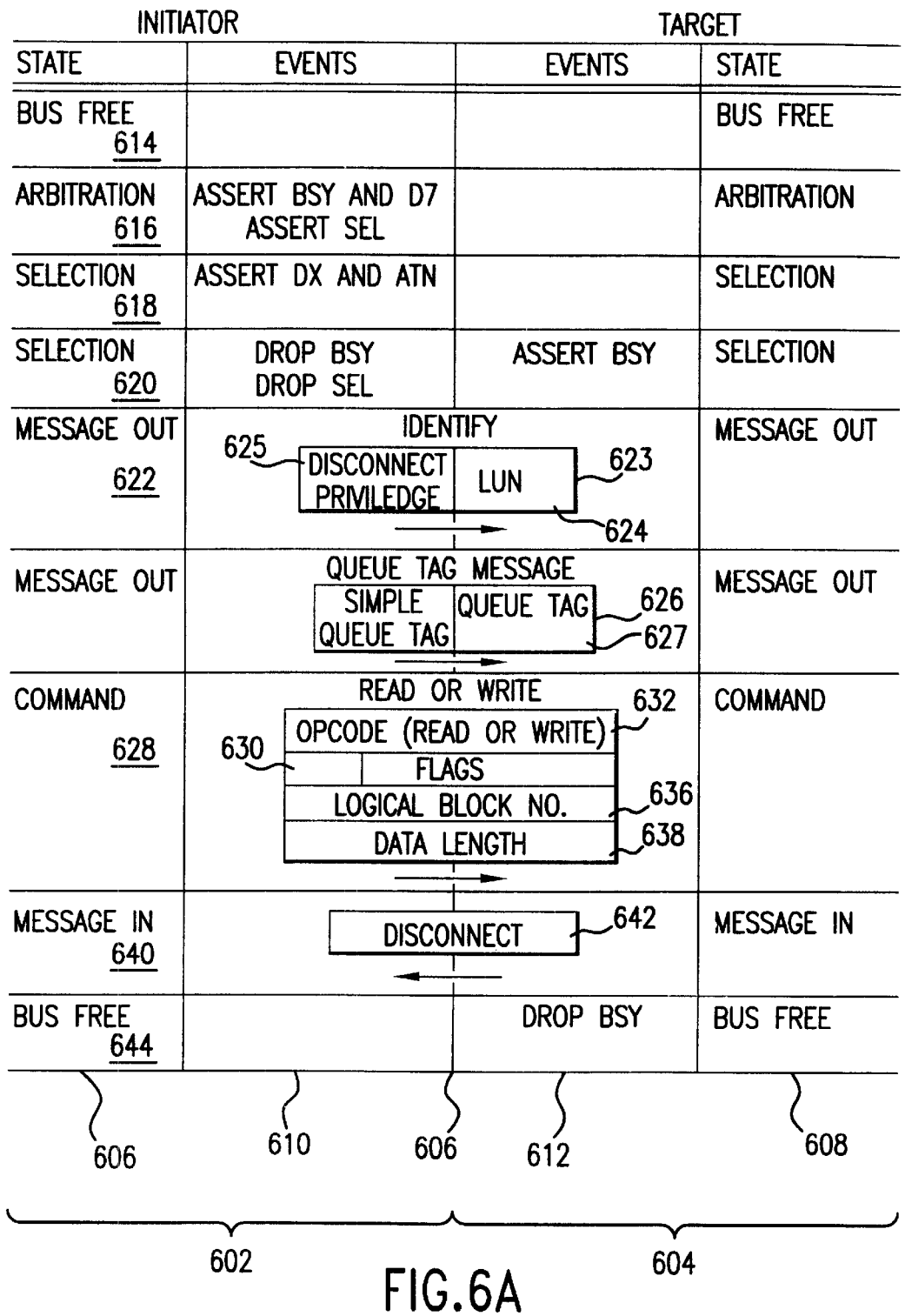

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424–426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore concurrently manage 656 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol Onto FCP

Figure 7B:
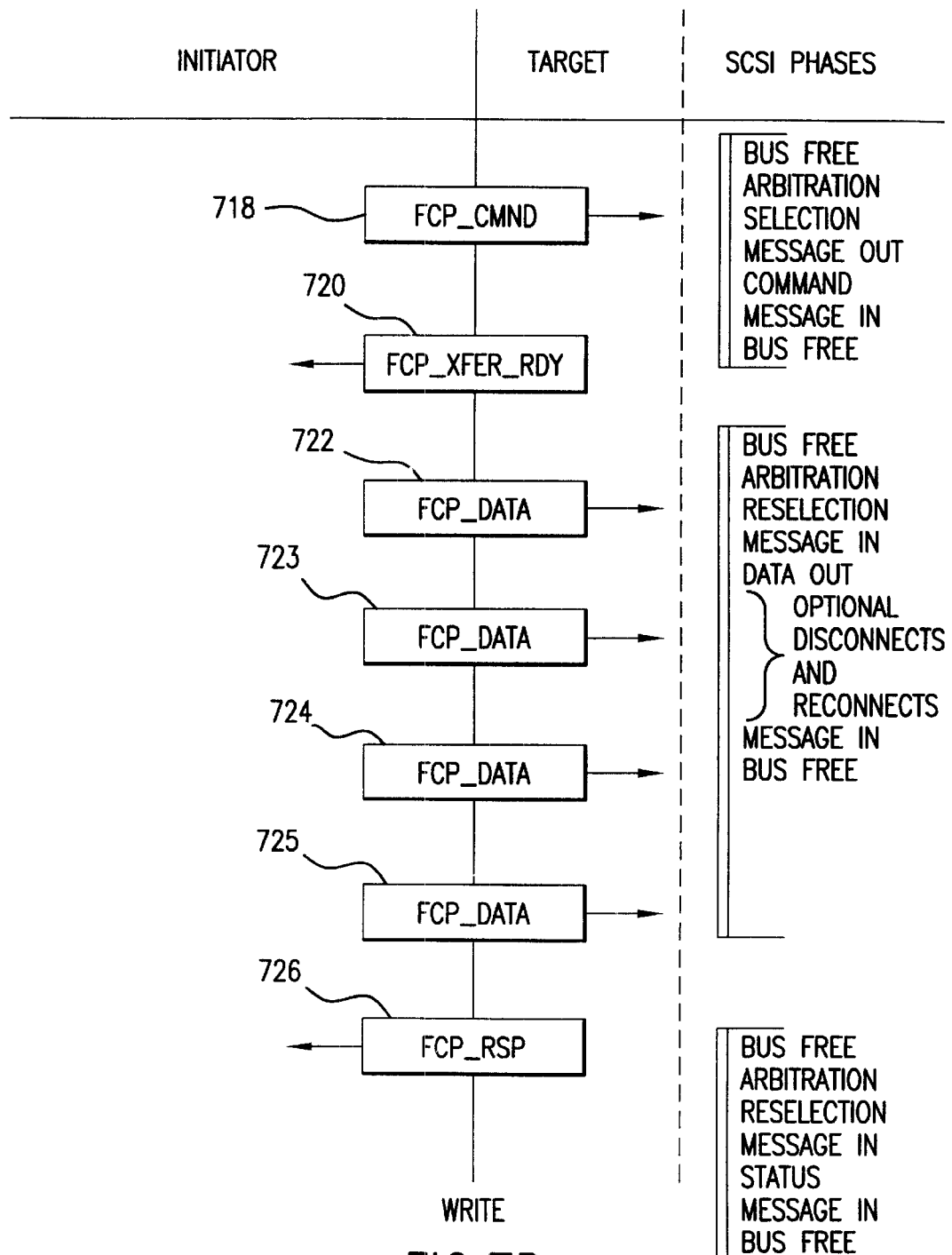

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP DATA frames 722-725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP RSP single-frame sequence 726 to the initiator.

The Tachyon TL FC Mass Storage Interface Controller and Tachyon TL Interface

The Tachyon TL FC Mass Storage Interface Controller ("TL") is a high-performance, low-cost, loop-based interface controller for use in the FC Ports that interconnect peripheral devices and computers to an FC arbitrated loop. In this subsection, an overview of the functionality of, and interface to, the TL will be presented. A more detailed description of the TL is included in U.S. patent application Ser. No. 09/183,164, entitled "Fibre Channel Controller," assigned to the Hewlett Packard Company, and filed on Oct. 30, 1998 that is hereby incorporated by reference in its entirety.

Figure 8:
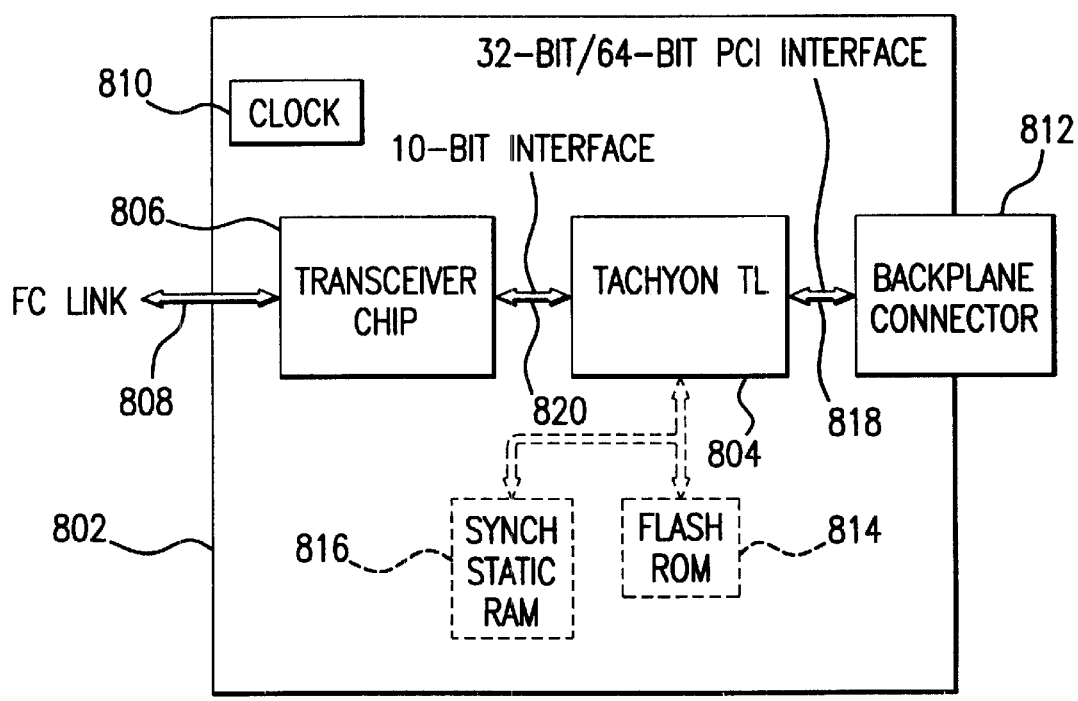
FIG. 8 shows a Tachyon TL FC Mass Storage Interface Controller incorporated into a typical FC/PCI host adapter.

FIG. 8 shows a TL incorporated into a typical FC/PCI host adapter. The FC/PCI host adapter 802 comprises a TL 804, a transceiver chip 806, an FC link 808, a clock 810, a backplane connector 812, and, optionally, a boot flash ROM 814, or a local synchronous static random access memory ("RAM") 816. The FC host adapter 802 communicates with the processor or processors of an FC node via the backplane connector 812 and a PCI bus within the FC node to which the processor or processors are coupled. The TL 804 is coupled to the backplane connector 812 via a PCI interface 818. The TL sends and receives FC frames to and from an FC arbitrated loop via a 10-bit interface 820 that couples the TL to the transceiver chip 806, which is, in turn, coupled to the FC arbitrated loop via the FC link 808. The clock 810 interfaces to the FC link. The FC host adapter 802 may serve, in terms of the previous discussion, as an NL_Port, and the FC host adapter 802, together with the computer system to which it is coupled via the backplane connector 812, compose an FC node that may be connected via the FC link 808 to an FC arbitrated loop topology.

Figure 9:
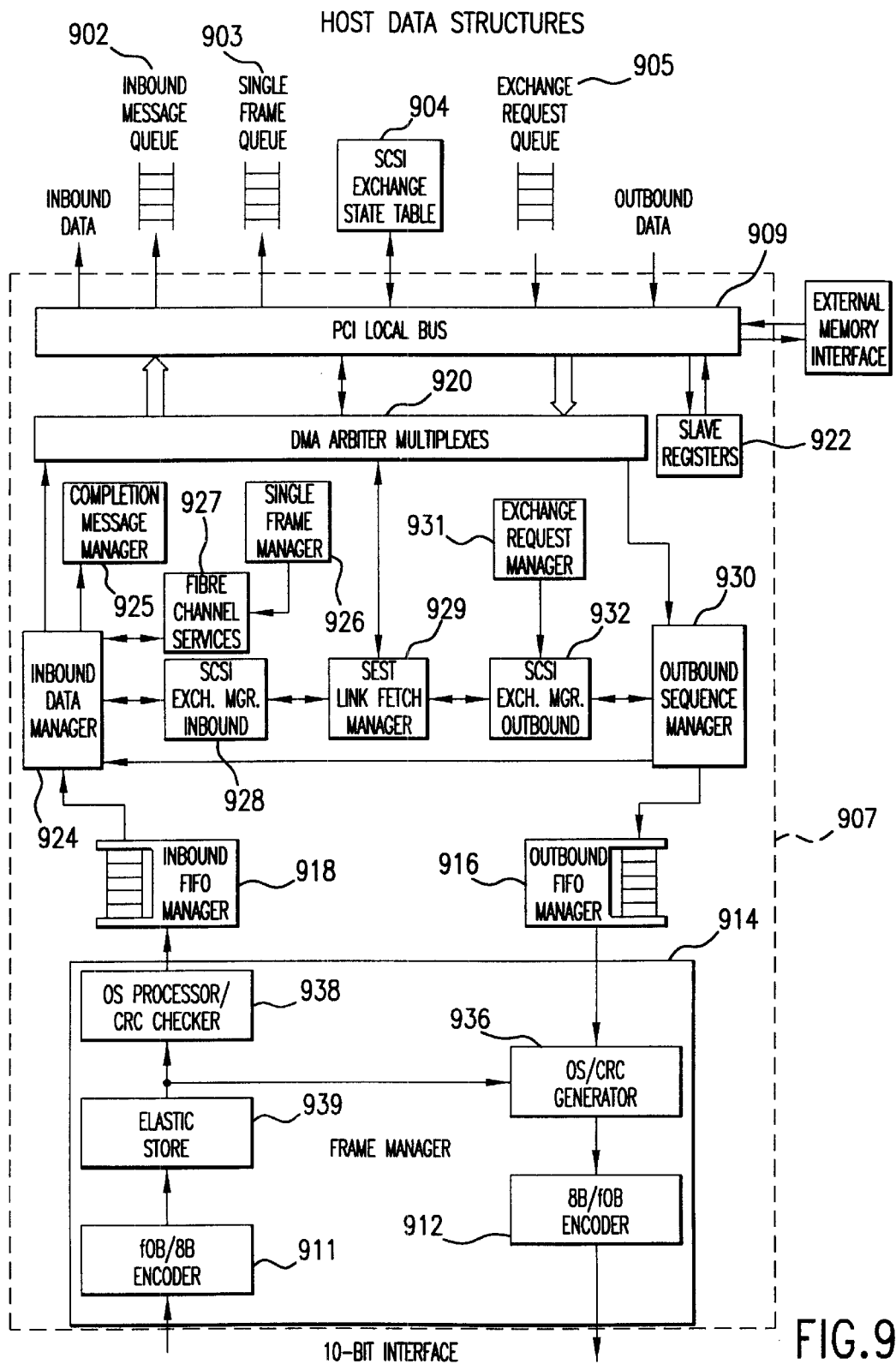
FIG. 9 shows a block diagram description of the Tachyon TL FC Mass Storage Interface Controller and the memory-based data structure interface between the Tachyon TL FC Mass Storage Interface Controller and the host.

FIG. 9 shows a block diagram description of the TL and the memory-based data structure interface between the TL and the host to which the TL is interconnected by a PCI bus. The memory-based data structures 902–905 are maintained in a memory component of the FC node that is accessible to the TL 907 via the PCI bus 909. In FIG. 9, the TL 907 is represented as being combined with the backplane connector (812 in FIG. 8) and PCI bus 909. The TL interfaces with a transceiver chip (806 in FIG. 8) via a 10 bit/8 bit decoder 911, for receiving inbound frames from the transceiver chip (806 in FIG. 8) and via an 8 bit/10 bit encoder 912 for outbound frames transmitted by the TL to the transceiver chip. The 10 bit/8 bit decoder 911 and 8 bit/10 bit encoder 912 are both subcomponents of the frame manager 914 that receives FC frames for transmission to the transceiver chip (806 in FIG. 8) from the TL via the outbound FIFO manager 916 and that receives a stream of data bits from the transceiver chip (806 in FIG. 8) via the 10 bit/8 bit decoder 911, processes the received data bits into FC frames, and stores the FC frames into the inbound FIFO manager 918. The other frame manager components 934, 936, and 938 buffer received data when the lack of clock synchronization between the transmitter and receiver components of the transceiver chip prevent immediate processing of the received data, generate FCP CRCs, and check. FCP CRCs, respectively, The DMA arbiter multiplexer 920 manages multiple internal DMA requests to the PCI local bus and the external memory interface. Internal block arbitration, as well as data path multiplexing, occurs in this block.

The processor or processors of the FC node control and exchange information with the TL by writing and reading various control registers 922 and by placing data into, and removing data from, the memory-based data structures 902–905. Internal components of the TL 924–932 read and write the control registers 922, receive data from, and place into, the memory based data structures 902–905, and exchange FC frames with the frame manager 914 via the inbound FIFO manager 918 and the outbound FIFO manager 916.

The inbound message queue ("IMQ") 902 contains completion messages that notify the host processor or processors of inbound and outbound transaction information and status information. The single frame queue ("SFQ") contains inbound unknown or unassisted FC frames that the TL 907 receives from the frame manager 914 and places into the SFQ. The SCSI exchange state table ("SEST") 904 is shared between the TL and the host and contains SEST entries that each corresponds to a current SCSI exchange (I/O operation). The exchange request queue ("ERQ") 905 contains I/O request blocks ("IRBs") that represent I/O requests sent by the host to the TL.

The completion message manager 925 manages the IMQ and provides queue entries to the inbound data manager 924 into which the inbound data manager places completion messages. The single frame manager 926 manages the SFQ in host memory and provides entries to the Fibre Channel services component 927 into which the Fibre Channel component services place inbound frames. The exchange request manager 931 fetches new entries from the ERQ and sends them to the SCSI exchange manger-outbound ("SEM-OUT") for processing. The inbound data manager 924 informs the inbound frame processors, i.e. the SCSI exchange manager-inbound ("SEM-IN") 928 and Fibre Channel services component 927, of new frames and routes the frames to their proper destination in the host. Also, the inbound data manager sends completion messages to the host via the IMQ. The Fibre Channel services component 927 manages the Fibre Channel frames that the SEM-IN 928 does not manage. The Fibre Channel services component places the frames in the SFQ. The SEM-IN 928 manages the phases of a SCSI exchange that receive a Fibre Channel sequence. The SEM-IN reads the SEST entries via the SEST link fetch manager 929 and either sends the inbound data to the proper host buffers or sends the request to the SEM-OUT 932 to send the next phases of Fibre Channel sequence. The SEST link fetch manager 929 is responsible for reading and writing SEST entries, depending upon requests from the SEM-IN 928 and SEM-OUT 932 components. The SEM-OUT 932 manages the phases of a SCSI exchange that require a Fibre Channel sequence to be sent. The SEM-OUT 932 reads the SEST entries via the SEST link fetch manager 929, builds the request to send those sequences, and sends the requests to the outbound sequence manager 930. The outbound sequence manager ("OSM") 930 processes requests from the SEM-OUT 932 to send Fibre Channel sequences from the host and retrieves Fibre Channel frame headers and payloads from the host to send to the remote node. The OSM segments the sequence into Fibre Channel frames of up to 1 KByte in size and queues them into the outbound FIFO manager 916.

Figure 10:
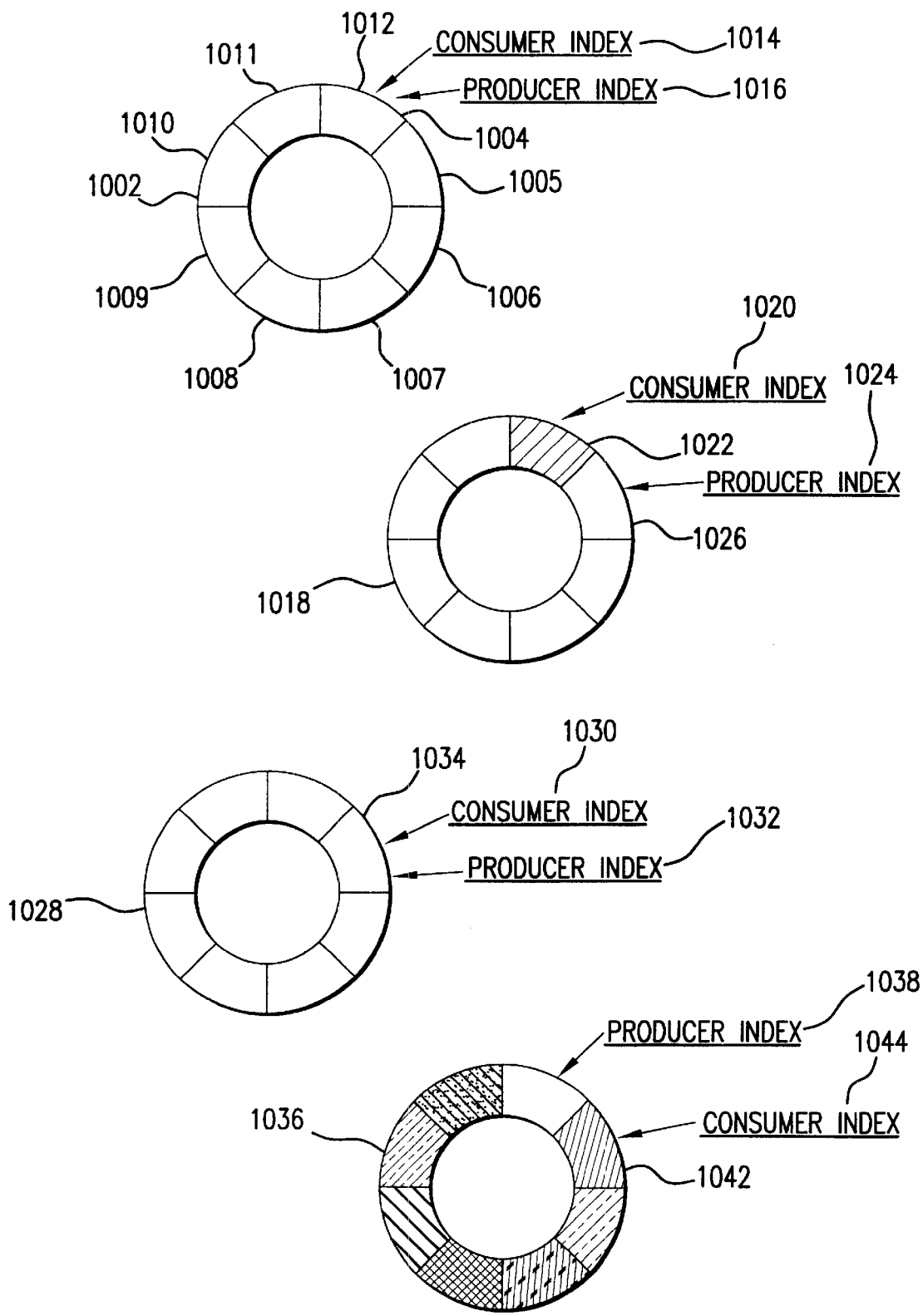
FIG. 10 shows the basic underlying circular queue data structure used in the Tachyon TL Fibre Channel Mass Storage Interface Controller interface.

The IMQ 902, SFQ 903, and ERQ 905 are implemented as circular queues. FIG. 10 shows the basic underlying circular queue data structure used in the TL controller interface. A circular queue is a first-in-first-out ("FIFO") queue that is logically represented in a circular fashion, such as the depiction of the circular queue 1002 at the top of FIG. 10. Each radial section 1004–1012, or slot, of a circular queue contains space for a queue entry, essentially a record-like data structure containing one or more data fields. The circular queue 1002 in FIG. 10 is shown with 8 queue entry slots 1004–1012 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1014 and the producer index 1016 point to the same empty queue entry slot 1012.

When a producer adds a queue entry to an empty circular queue 1002, a circular queue with one valid queue entry 1018 is produced. The consumer index 1020 is not changed, as a result of which the consumer index points to the single valid queue entry 1022 in the circular queue 1018. After the producer inserts the queue entry 1022, the producer increments the producer index 1024 to point to the next available slot 1026 within the circular queue 1018 into which the producer can add a second queue entry. If the consumer now removes the single queue entry 1022, an empty circular queue 1028 is produced. When the consumer has removed the available queue entry 1022, the consumer increments the consumer index 1030. As in the previous depiction of an empty circular queue 1002, the empty circular queue 1028 produced by removing the single queue entry 1022 has both the consumer. index 1030 and the producer index 1032 pointing to the same empty, available queue entry slot 1034. If a producer successively adds queue entries at a faster rate than a consumer can consume them, a full circular queue 1036 will eventually be produced. In a full circular queue 1036, the producer index 1038 points to a single empty queue entry slot within the circular queue that immediately precedes the first available valid queue entry 1042 pointed to by the consumer index 1044.

Figure 11:
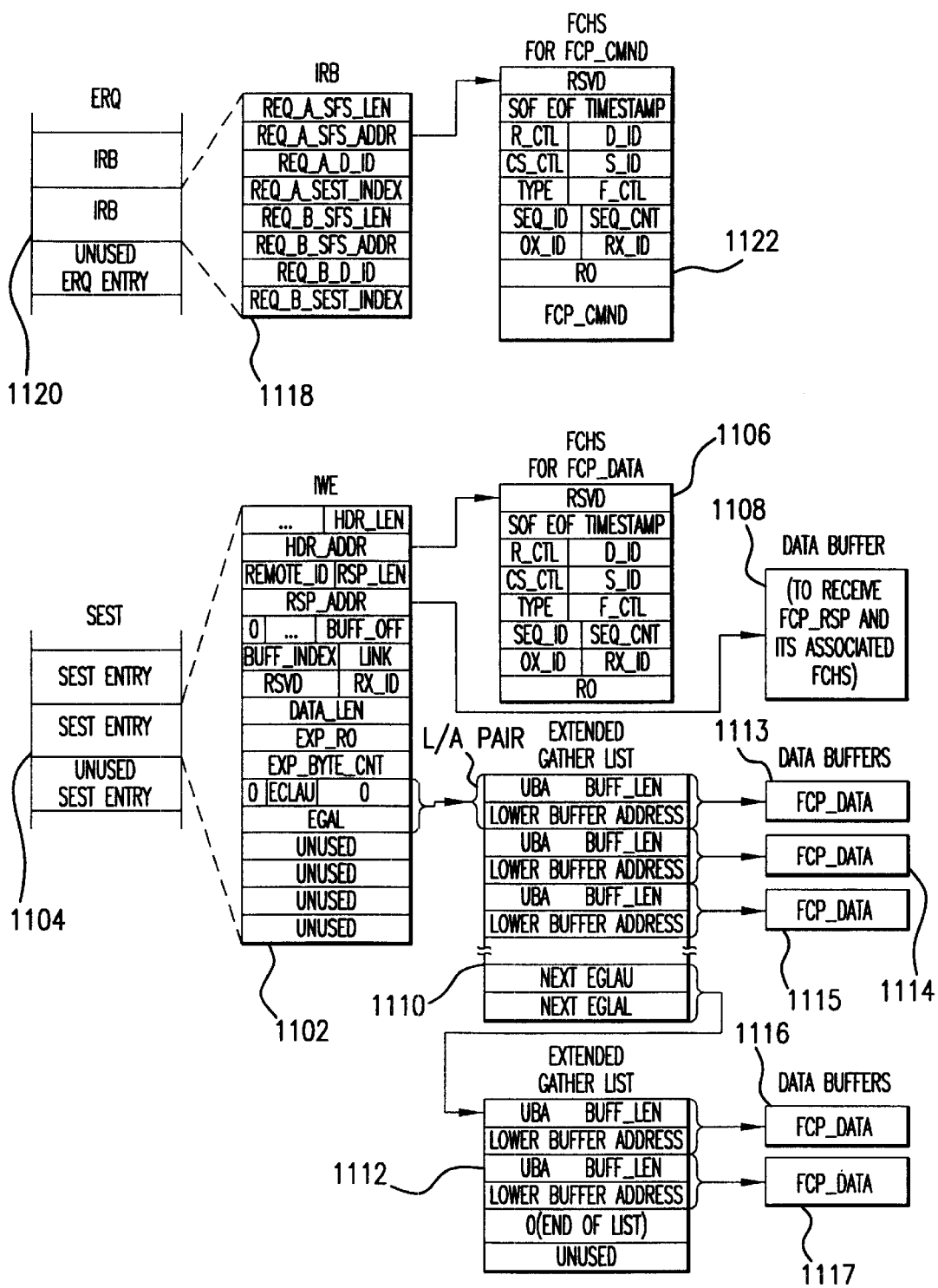
FIG. 11 shows a detailed view of the host memory data structures required to perform an initiated FC Protocol for SCSI write operation from four or more data buffers.

FIG. 11 shows a more detailed view of the host memory data structures required to perform an FCP write operation where the FC node in which a TL resides is the initiator of the FCP write operation and where the data payload that will include the data to be written requires 4 or more data buffers. The host prepares an initiator write entry ("IWE") 1102 within a SEST entry 1104 in the SEST (904 in FIG. 9). Associated with the IWE are: (1) a Fibre Channel header structure ("FCHS") 1106 that is used to send the FCP_DATA sequence; (2) a data buffer 1108 that is used to receive the FCP_RSP frame from the SCSI target; and (3) one or more extended scatter gather list ("SGL") pages 1110 and 1112 that contain pointers to data buffers 1113–1117 in which the host places the data to be written to the SCSI target via the FCP_DATA sequence. The host then creates an I/O request block ("IRB") 1118 in an unused ERQ entry 1120 and associates the IRB with an FCHS 1122 that is used for the FCP_CMND sequence. The host then increments the ERQ producer index. The producer index increment is detected by the TL, and the TL then launches the FCP write operation. The TL uses the information and data stored within the IRB 1118 and RWE 1102, and the data structures associated with the IRB and RWE, to conduct the entire FCP write operation, including the FCP_CMND sequence, the FCP_XFER_RDY sequence, and the FCP_DATA sequence. The TL receives from the target a FCP_RSP sequence at the completion of the FCP write operation.

Figure 12:
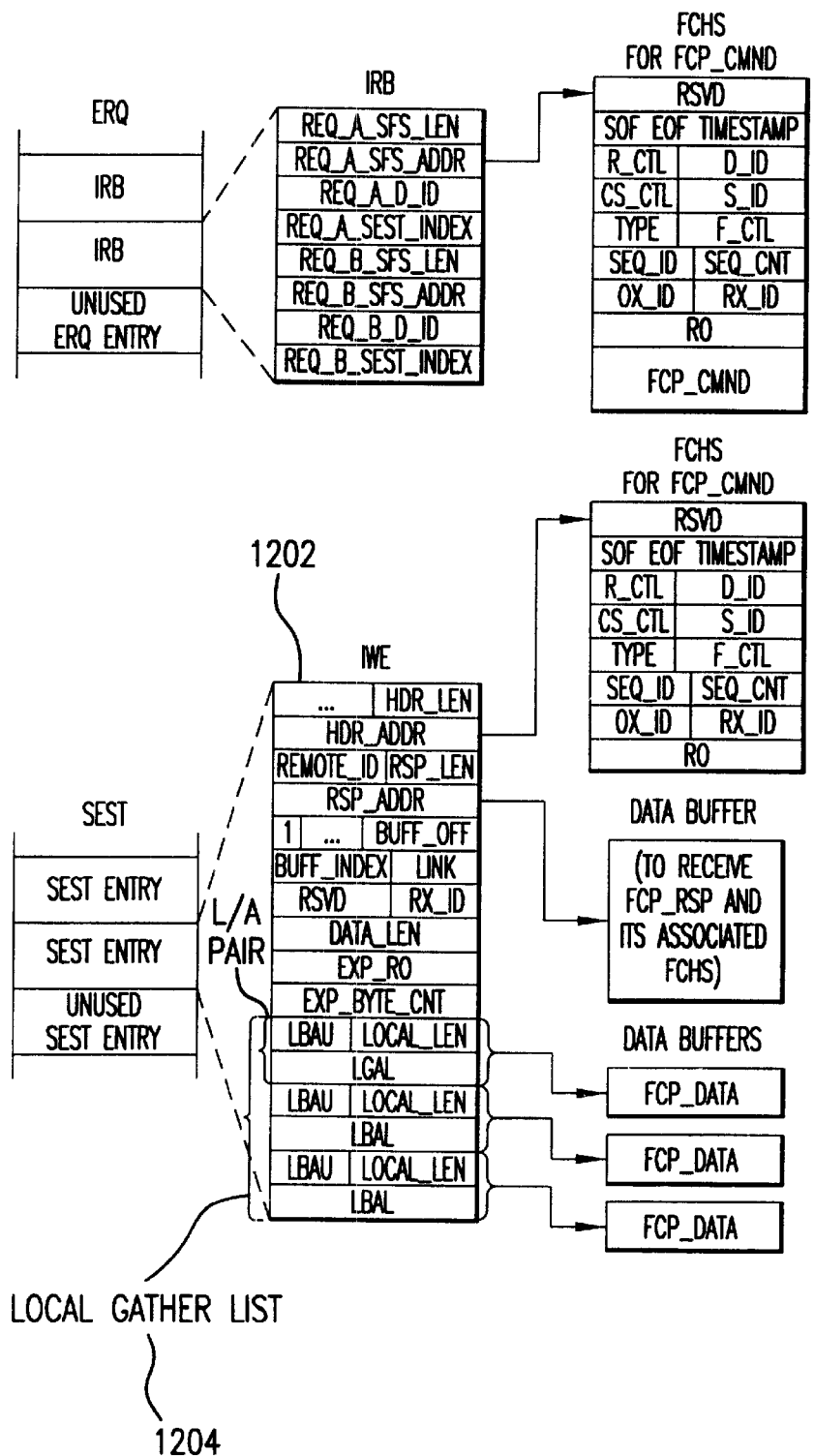
FIG. 12 shows the host memory data structures required to perform an initiated FC Protocol for SCSI write operation from three or less data buffers.

FIG. 12 shows the host memory data structures required to perform an FCP write operation where the FC node within which the TL resides is the initiator of the FCP write operation and the data payload of the FCP_DATA sequence can fit into three or fewer data buffers. The data structure shown in FIG. 12 are similar to those shown in FIG. 11 with the exception that, rather than having extended SGL pages (1110 and 1112 in FIG. 11) external from the IWE (1102 in FIG. 11), the IWE 1202 in FIG. 12 includes a local SGL 1204 that is included within the IWE 1202. Otherwise, the operations carried out by the TL in response to the incrementing of the ERQ producer index by the host are analogous to those carried out for the FCP write operation described above with reference to FIG. 11.

Figure 13:
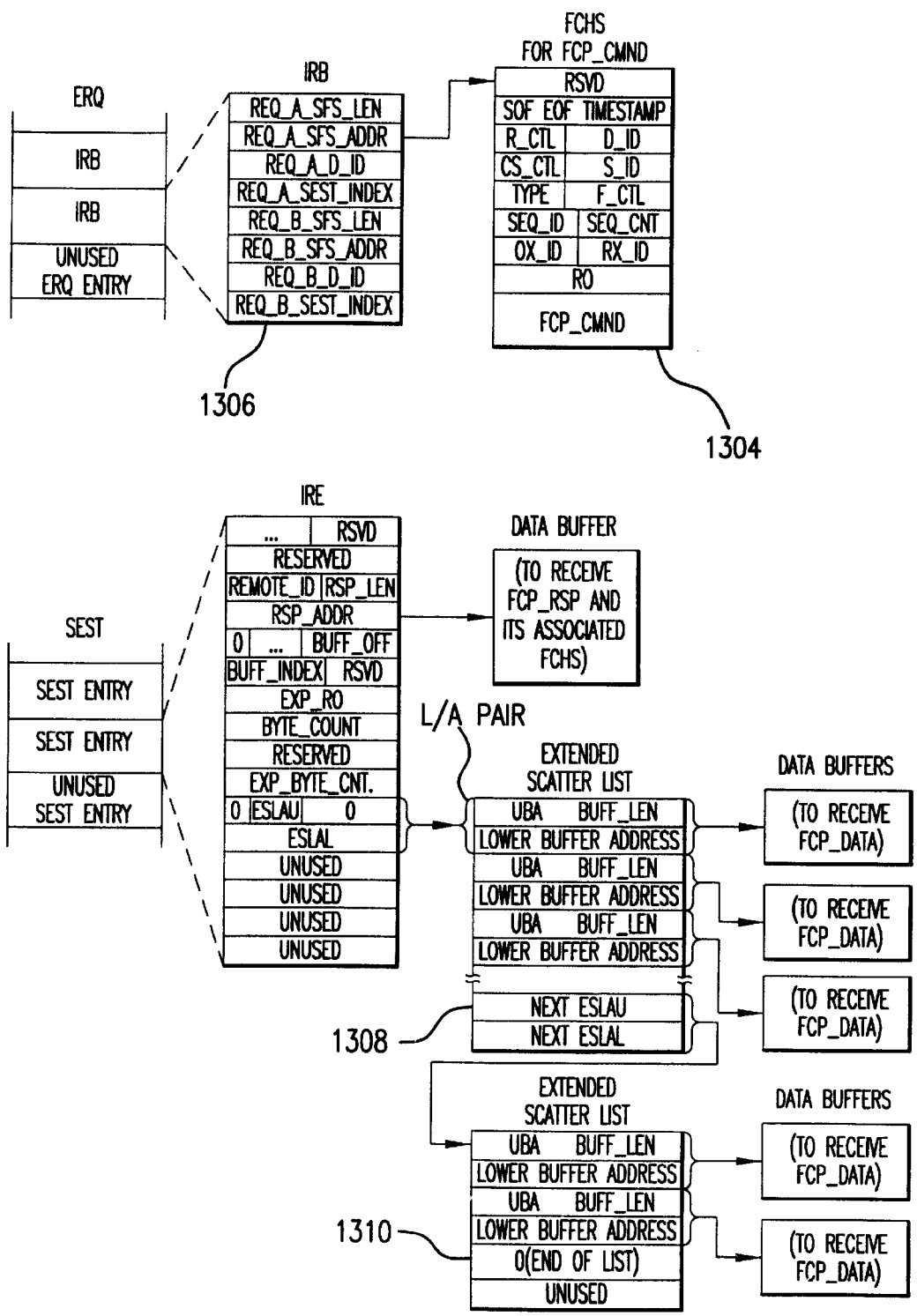
FIG. 13 shows the host memory data structures used to perform an initiated FC Protocol for SCSI read operation to more than three data buffers.

FIG. 13 shows the host memory data structures used to perform an FCP read operation where the FC node in which the TL resides is the initiator of the read operation and the data to be read will fill more than three data buffers. These data structures are similar to those shown in FIG. 11, with the following exceptions: (1) rather than an IWE (1102 in FIG. 11), the SEST entry created by the host contains an initiator read entry ("IRE"); (2) there is no FCHS for the FCP_DATA sequence (1106 in FIG. 11); and (3) the FCHS for the FCP_CMND sequence 1304 associated with the IRB 1306 contains a read command, rather than a write command as in the case of the FCHS (1122 in FIG. 11) for the write operation. As with the write operation, the host updates the ERQ producer index in order to initiate the read operation, and the TL uses the information stored in the data structures in FIG. 13 to conduct the FCP_CMND sequence and the FCP_DATA sequences, and receives the FCP_RSP sequence from the target SCSI device at the conclusion of the read operation.

Figure 14:
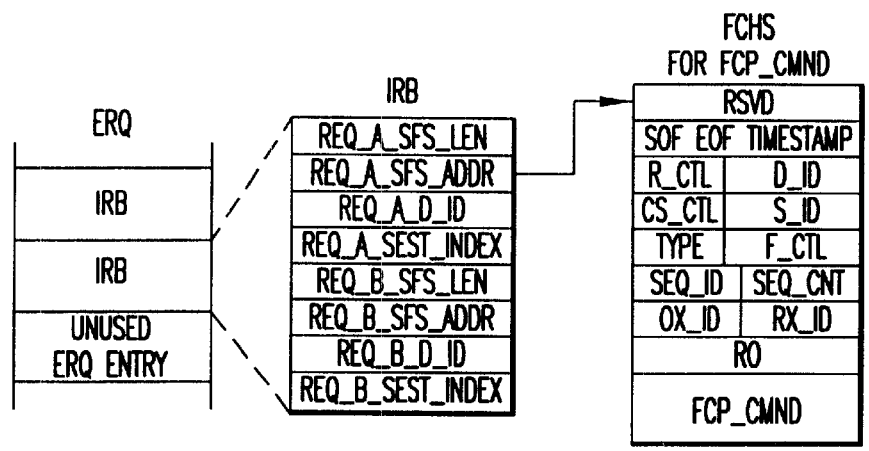
FIG. 14 shows the data structures required to perform an initiated FC Protocol for SCSI read operation to three or fewer data buffers.
Figure 14:
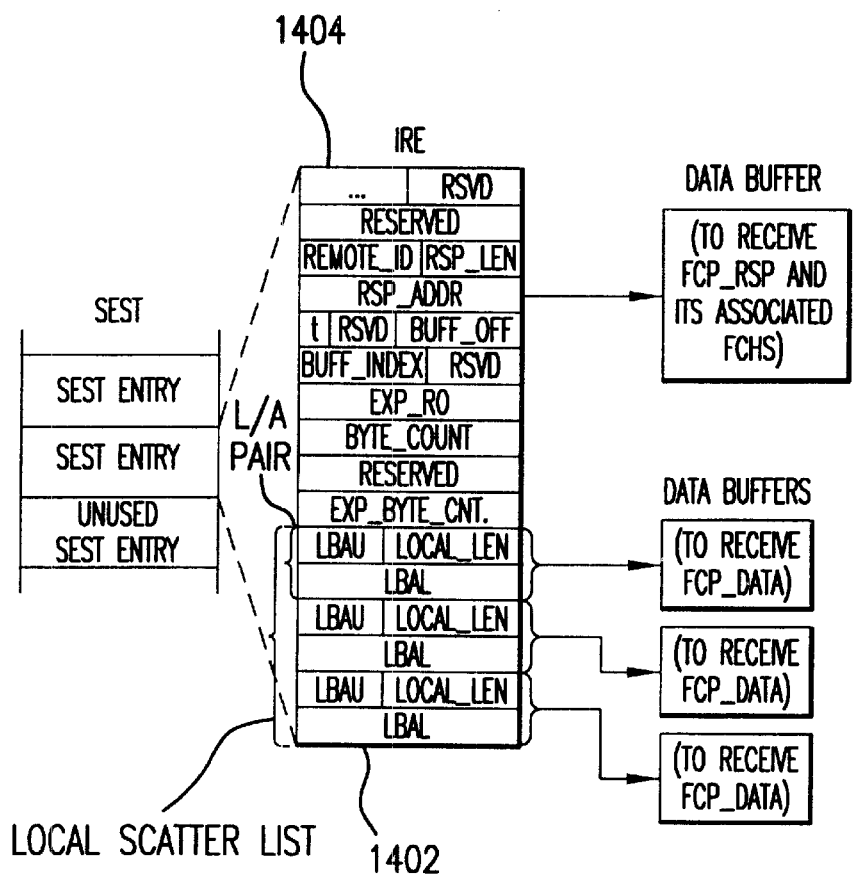

FIG. 14 shows the data structures required to perform the FCP read operation where the FC node in which the TL resides is the initiator of the operation and where the data to be received can fit into three or fewer data buffers. FIG. 14 bears the same relationship to FIG. 13 as FIG. 12 bears to FIG. 11. Instead of the external extended FCL pages (1308 and 1310 in FIG. 13), a local SGL 1402 is included within the IRE 1404. Otherwise, the operations conducted by the TL in order to complete the FCP read operation are identical with those discussed with reference to FIG. 13.

Figure 15:
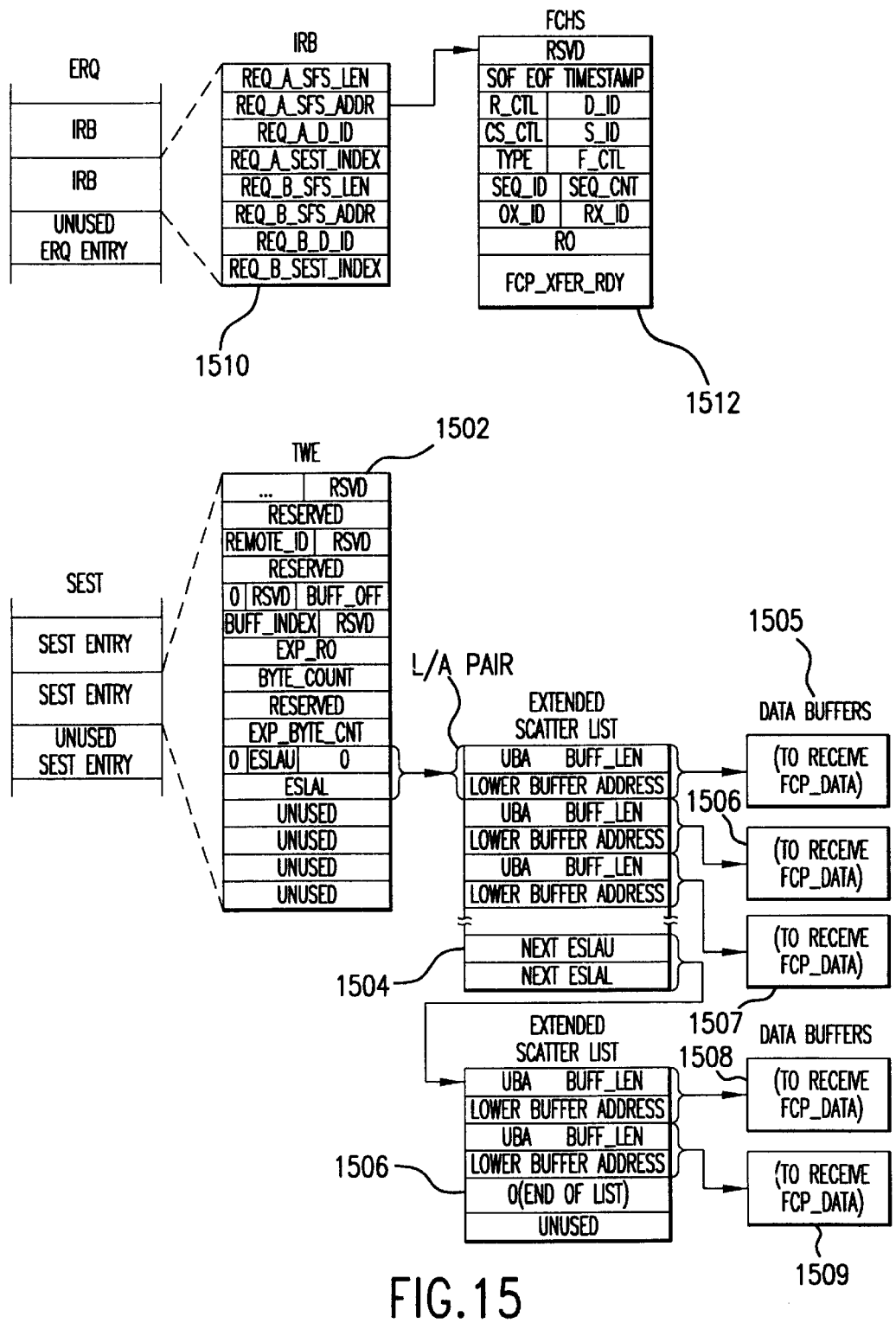
FIG. 15 shows the host memory data structures required for an FC node that is the target of an FC Protocol for a SCSI write operation initiated by another FC node to more than three data buffers.

FIG. 15 shows the host memory data. structures required for an FC node that is the target of a FCP write operation initiated by another FC node to carry out the indicated FCP write operation at the FC target node. When the TL in the FCP target node receives a FCP_CMND frame from the FC initiator node, the TL places it into the SFQ (903 in FIG. 9) and notifies the host via an inbound completion message. Upon receiving the inbound completion message, the host allocates and fills in the data structures shown in FIG. 13. These include the target write entry ("TWE") 1502 which is associated with one or more external extended SGL pages 1506 and 1506. These external extended SGL pages are, in turn, associated with data buffers 1505–1509 in which the data transferred from the FC initiator node will be placed after being extracted from the FCP_DATA sequence. The host also creates an IRB 1510 associated with an FCHS 1512 for the FCP_XFER_RDY sequence that will be transmitted back to the FC initiator node in order to elicit the FCP_DATA sequence. The host initiates sending of the FCP_XFER_RDY sequence and subsequent reception of the write data by updating the ERQ producer index register.

Figure 16:
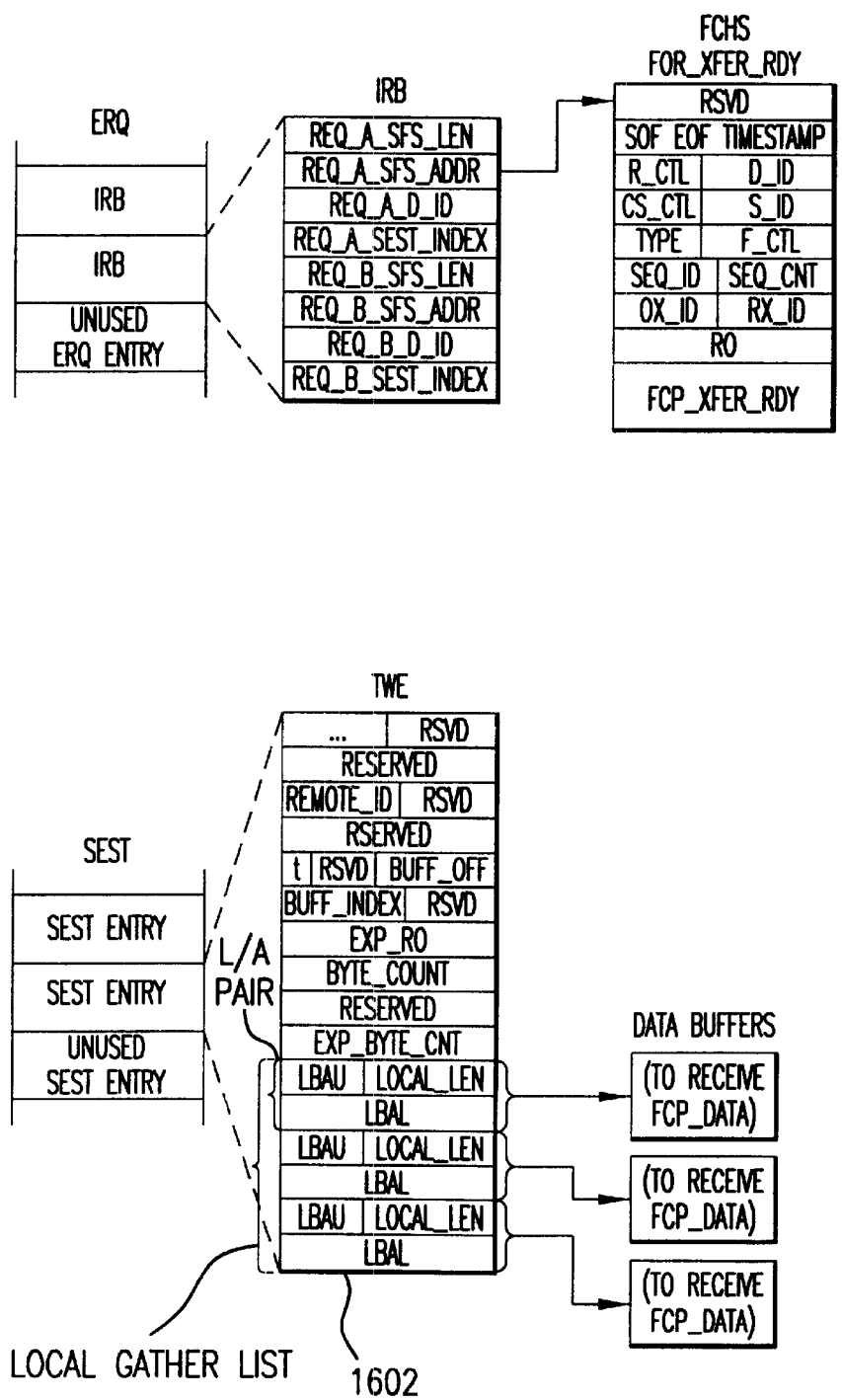
FIG. 16 shows the host memory data structures required for an FC node that is the target of an FC Protocol for a SCSI write operation initiated by another FC node to three or fewer data buffers.

FIG. 16 bears the same relationship to FIG. 15 as FIG. 12 bears to FIG. 11 and FIG. 14 bears to FIG. 13 showing the host memory structures for a targeted FCP write operation employing a SGL. The only essential difference between FIGS. 15 and 16 are that the external extended SGL pages (1504 and 1506 in FIG. 15) are replaced by a local SGL 1602.

Figure 17:
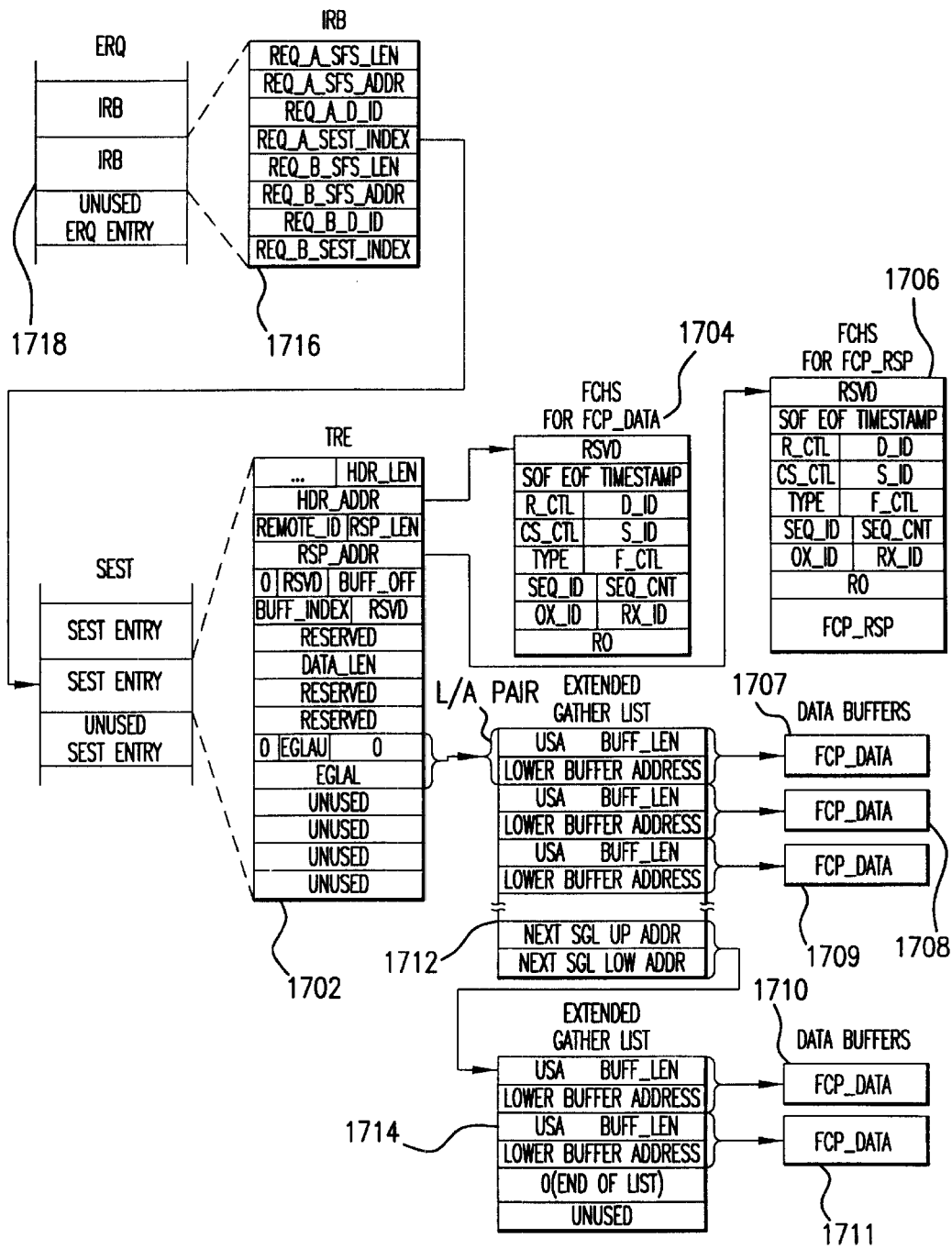
FIG. 17 shows the host memory data structures required for an FC target node to carry out a read operation initiated by an FC initiator node from more than three data buffers.

FIG. 17 shows the host memory data structures required for an FC target node to carry out a read operation initiated by an FC initiator node. These data structures are similar to the data structures required by an FC target node to respond to an FCP write operation, shown in FIG. 15, with the following exceptions: (1) there is no FCHS for a FCP_XFER_RDY operation (1512 in FIG. 15) since no FCP_XFER_RDY sequence is involved; (2) the TWE (1502 in FIG. 15) is replaced in FIG. 17 with a target read entry ("TRE") 1702; and (3) an FCHS for an FCP_DATA sequence 1704 and an FCHS for an FCP_RSP sequence 1706 are both associated with the TRE 1702. When the TL receives an FCP_CMND frame from the FC initiator node, the TL places the FCP_CMND frame into the SFQ (903 in FIG. 9) and notifies the host via an inbound completion message. When the host is notified by the inbound completion message, it interprets the contents of the FCP_CMND frame and sets up the data structures in FIG. 17 in order to respond to the SCSI read command represented by the FCP_CMND frame. The host creates in an unused SEST entry a TRE 1702 data structure and associates with the TRE 1702 the FCHS for the FCP_DATA sequence 1704 and the FSHS for the FCP_RSP sequence 1706. The host also allocates a number of data buffers that the host fills via a SCSI read operation and that will be transferred in the subsequent FCP_DATA sequence back to the FC initiator node. These data buffers 1707–1711 are referenced by one or more external extended SGL pages 1712 and 1714. The host also creates an IRB 1716 in an unused ERQ entry 1718. By updating the ERQ producer index, the host initiates the return of data solicited by the FCP read operation, mediated by the TL, resulting in sending by the FC target node the FCP_DATA sequences containing the data read from the SCSI device and a final FCP_RSP sequence indicating completion of the read command.

Figure 18:
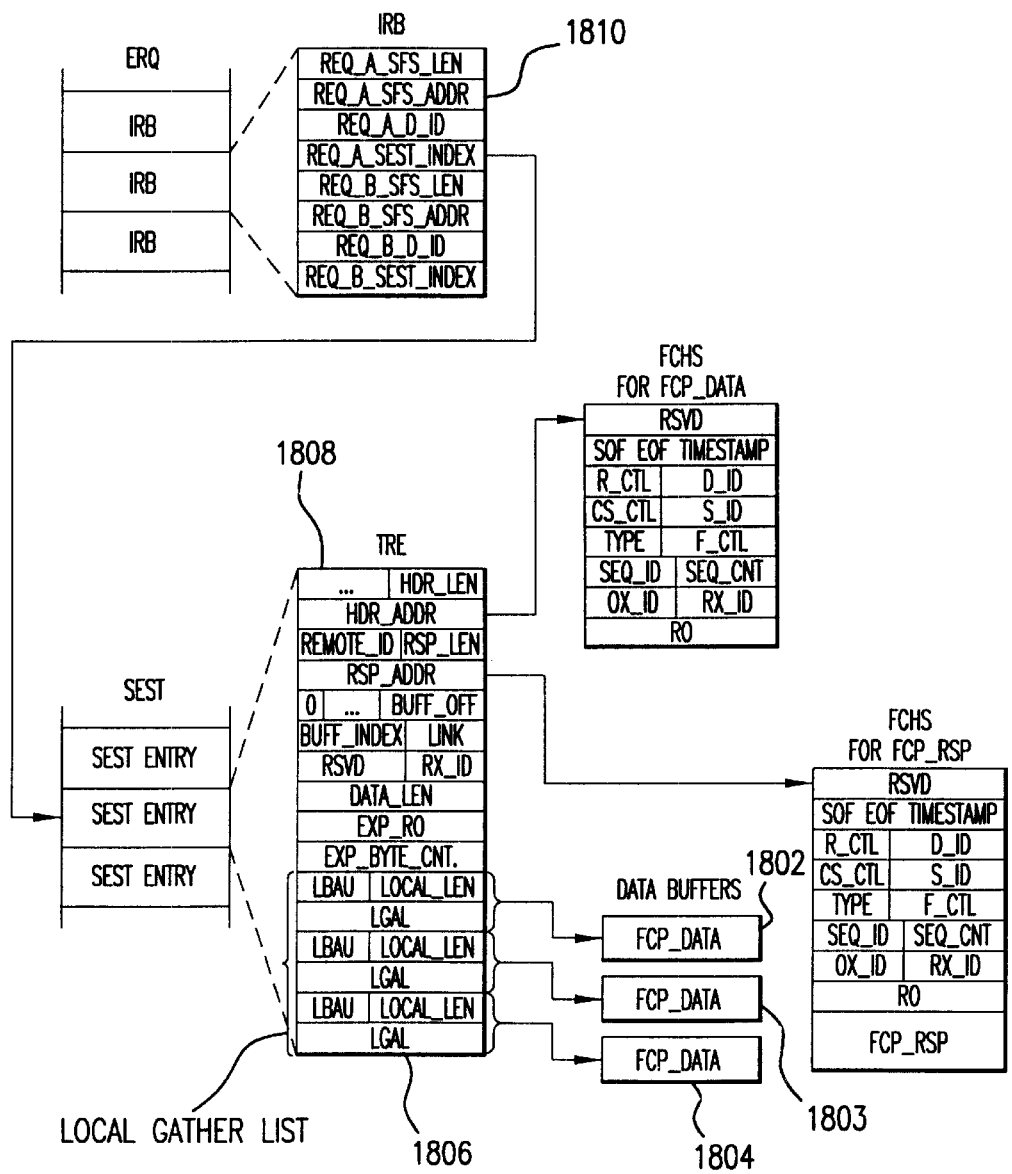
FIG. 18 shows the host memory data structures required for an FC target node to carry out a read operation initiated by an FC initiator node from three or less data buffers.

FIG. 18 bears the same relationship to FIG. 17 as FIGS. 12, 14 and 16 bear to FIGS. 11, 13 and 15, respectively. The operations carried out by the TL in order to respond to an FCP read request are the same as those discussed with reference to FIG. 17. The only difference in FIG. 18 is that the data buffers that contain the data read from the SCSI device 1802–1804 are referenced from a local SGL 1806 included within the TRE 1808. cl Arbitrated Loop Initialization As discussed above, the FC frame header contains fields that specify the source and destination fabric addresses of the FC frame. Both the D_ID and the S_ID are 3-byte quantities that specify a three-part fabric address for a particular FC Port. These three parts include specification of an FC domain, an FC node address, and an FC Port within the FC node. In an arbitrated loop topology, each of the 127 possible active nodes acquires, during loop initialization, an arbitrated loop physical address ("AL_PA"). The AL_PA is a 1-byte quantity that corresponds to the FC Port specification within the D_ID and S_ID of the FC frame header. Because there are at most 127 active nodes interconnected by an arbitrated loop topology, the single byte AL_PA is sufficient to uniquely address each node within the arbitrated loop.

Figure 19:
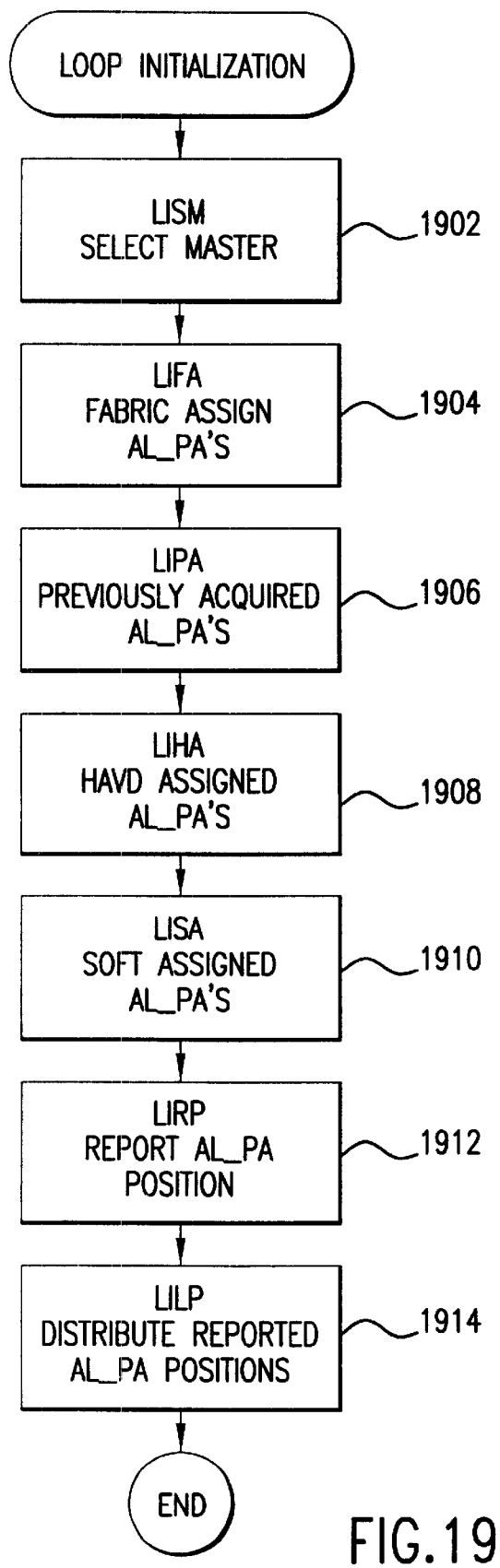
FIG. 19 shows a diagram of the seven phases of FC arbitrated loop initialization.
Figure 20:
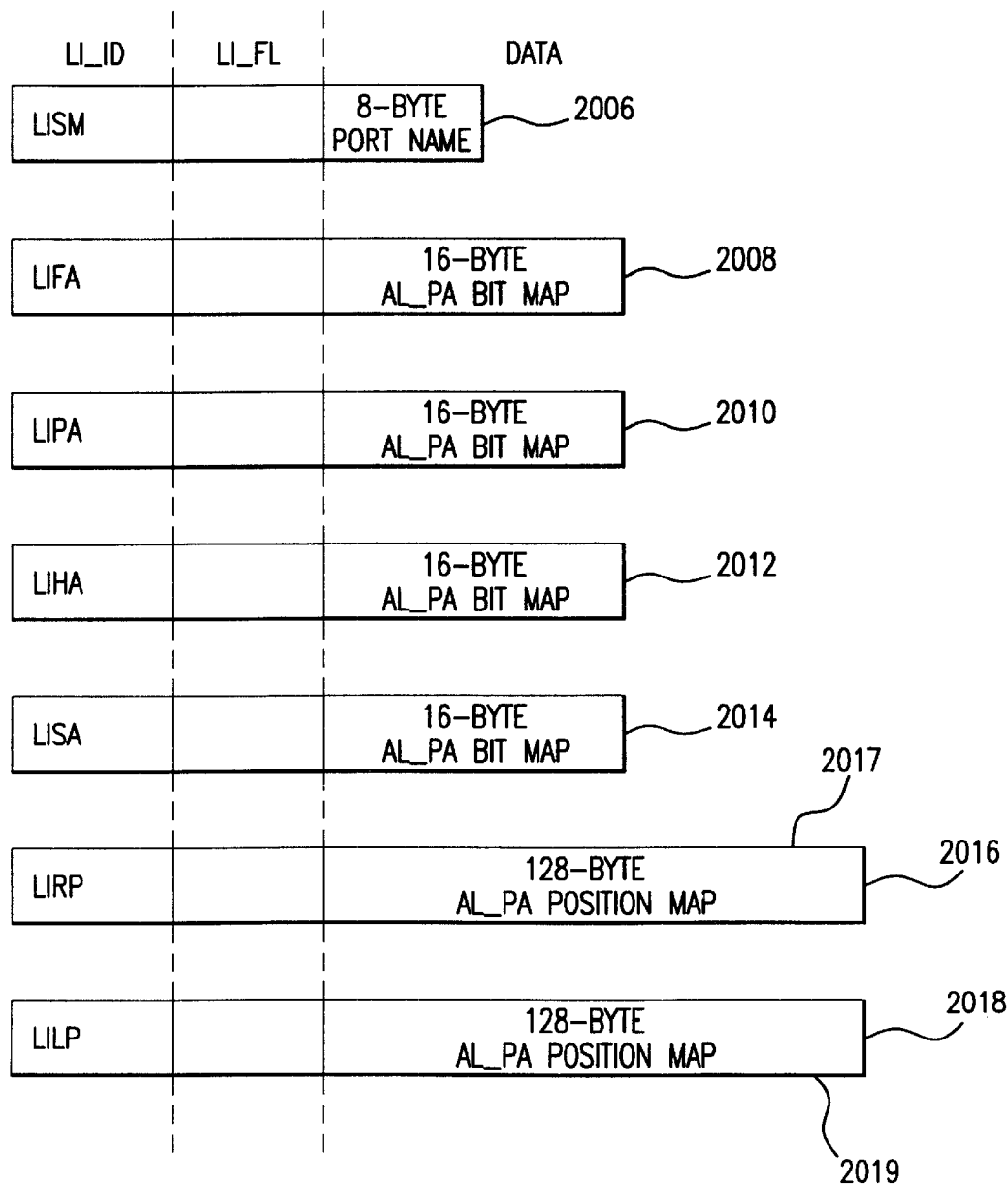
FIG. 20 shows the data payload of FC frames transmitted by FC nodes in an arbitrated loop topology during each of the seven phases of loop initialization shown in FIG. 19.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 19 shows a diagram of the seven phases of FC arbitrated loop initialization. FIG. 20 shows the data payload of FC frames transmitted by FC nodes in an arbitrated loop topology during each of the seven phases of loop initialization shown in FIG. 19. The data payload for the FC frames used in each of the different phases of loop initialization comprises three different fields, shown as columns 2002–2004 in FIG. 20. The first field 2002 within each of the different data payload structures is the LI_ID field. The LI_ID field contains a 16-bit code corresponding to one of the seven phases of group initialization. The LI_FL field 2003 for each of the different data payload layouts shown in FIG. 20 contains various flags, including flags that specify whether the final two phases of loop initialization are supported by a particular FC Port. The TL supports all seven phases of loop initialization. Finally, the data portion of the data payload of each of the data payload layouts 2004 contains data fields of varying lengths specific to each of the seven phases of loop initialization. In the following discussion, the seven phases of loop initialization will be described with references to both FIGS. 19 and 20.

In the first phase of loop initialization 1902, called "LISM," a loop initialization master is selected. This first phase of loop initialization follows flooding of the loop with loop initialization primitives ("LIPs"). All active nodes transmit an LISM FC arbitrated loop initialization frame 2006 that includes the transmitting node's 8-byte port name. Each FC Port participating in loop initialization continues to transmit LISM FC arbitrated loop initialization frames and continues to forward any received LISM FC arbitrated loop initialization frames to subsequent FC nodes in the arbitrated loop until either the FC Port detects an FC frame transmitted by another FC Port having a lower combined port address, where a combined port address comprises the D_ID, S_ID, and 8-byte port name, in which case the other FC Port will become the loop initialization master ("LIM"), or until the FC Port receives back an FC arbitrated loop initialization frame that that FC Port originally transmitted, in which case the FC Port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 1904, in which any node having a fabric assigned AL_PA can attempt to acquire that AL_PA. The LIM transmits an FC arbitrated loop initialization frame having a data payload formatted according to the data payload layout 2008 in FIG. 20. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC Port within the arbitrated loop, each FC node also sets a bit in the bit map to indicate that FC nodes fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 1906, the LIM transmits an FC frame containing a data payload formatted according to the data layout 2010 in FIG. 20. The data field contains the AL_PA bit map returned to the LIM during the previous LIPA phase of loop initialization. During the LIPA phase 2010, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 1908 and LISA 1910 are analogous to the above-discussed LIPA phase 1906. Both the LIHA phase 1908 and the LISA phase 1910 employ FC frames with data payloads 2012 and 2014 similar to the data layout for the LIPA phase 2010 and LIFA phase 2008. The bit map from the previous phase is recirculated by the LIM in both the LIHA 1908 and LISA 1910 phases, so that any FC Port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC Ports in the arbitrated loop topology. If an FC Port is not able to acquire an AL_PA at the completion of the LISA phase 1910, then that FC Port may not participate in the arbitrated loop. The FC-AL-2 standard contains various provisions to enable a nonparticipating node to attempt to join the arbitrated loop, including restarting the loop initialization process.

In the LIRP phase of loop initialization 1912, the LIM transmits an FC frame containing a data payload having the data layout 2016 in FIG. 20. The data field 2017 of this data layout 2016 contains a 128-byte AL_PA position map. The LIM places the LIM's acquired AL_PA, if the LIM has acquired an AL_PA, into the first AL_PA position within the AL_PA position map, following an AL_PA count byte at byte 0 in the data field 2017, and each successive FC node that receives and retransmits the LIRP FC arbitrated loop initialization frame places that FC node's AL_PA in successive positions within the AL_PA position map. In the final loop initialization phase LILP 1914, the. AL_PA position map is recirculated by the LIM through each FC Port in the arbitrated loop topology so that the FC Ports can acquire, and save in memory, the completed AL_PA position map. This AL_PA position map allows each FC Port within the arbitrated loop to determine its position relative to the other FC Ports within the arbitrated loop.

Hardware Implementation of an Improved Method for Executing FCP Read Commands

The present invention concerns a new method, implemented within the TL, for responding to read commands received by the TL from an initiating FC node. As discussed above with reference to FIG. 7A, a SCSI read command involves three main phases. In the first phase, the initiator sends an FCP_CMND sequence (702 in FIG. 7A) to the target. The target responds by optionally sending an FCP_XFER_RDY sequence (708 in FIG. 7A) back to the initiator (although, in practice, this is rarely done, and is not allowed in many implementations) followed by an FCP_DATA sequence that may be composed of a number of FC data frames (710–713 in FIG. 7A). In the third phase, the target completes execution of the read command by sending an FCP_RESPONSE sequence (716 in FIG. 7A) back to the initiator.

Figure 21:
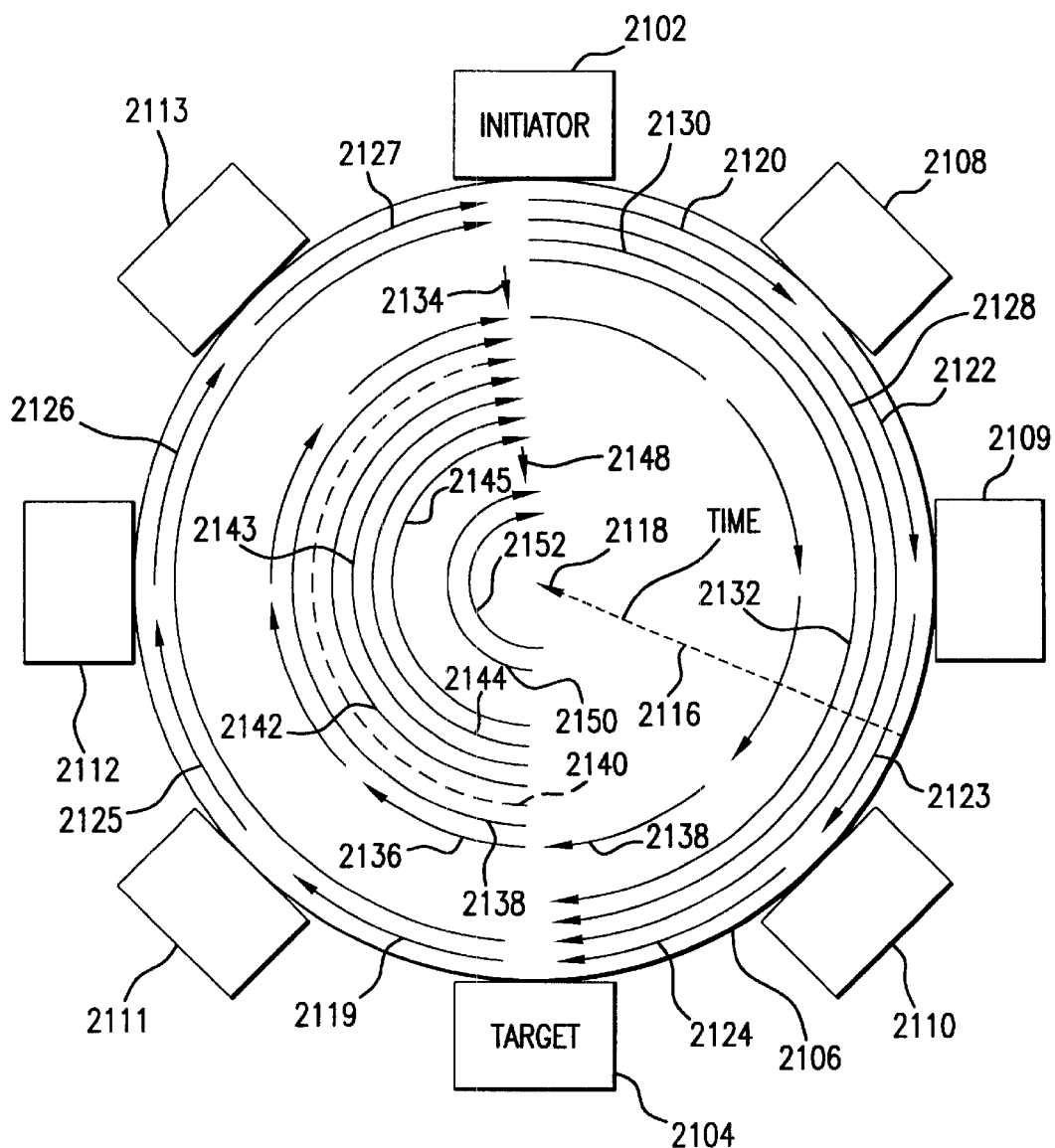
FIG. 21 illustrates the three phases of SCSI read command execution for an initiator node and a target that includes one type of currently available FC Port.
Figure 22:
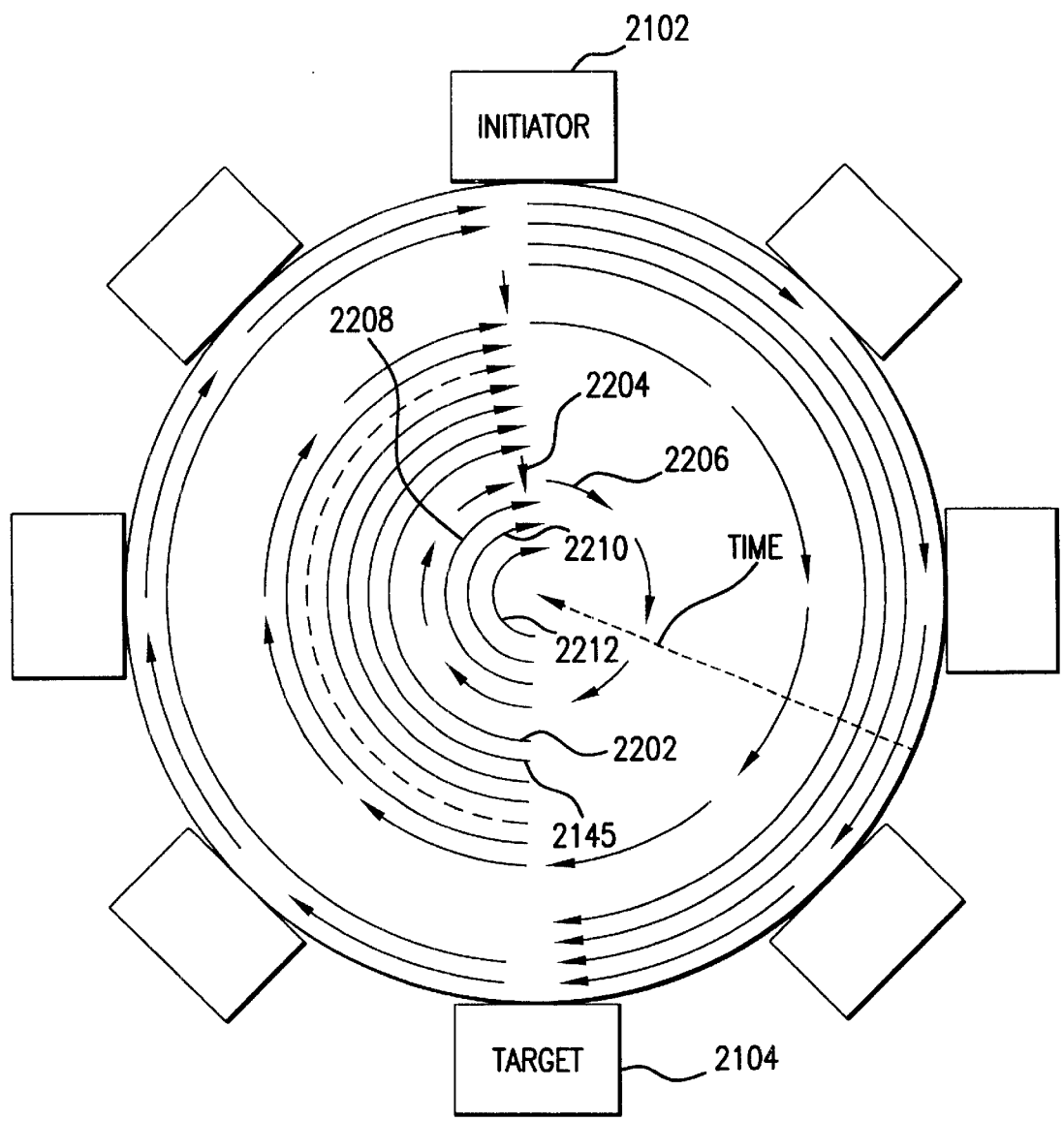
FIG. 22 illustrates the three phases of SCSI read command execution for another type of currently available FC Port.
Figure 23:
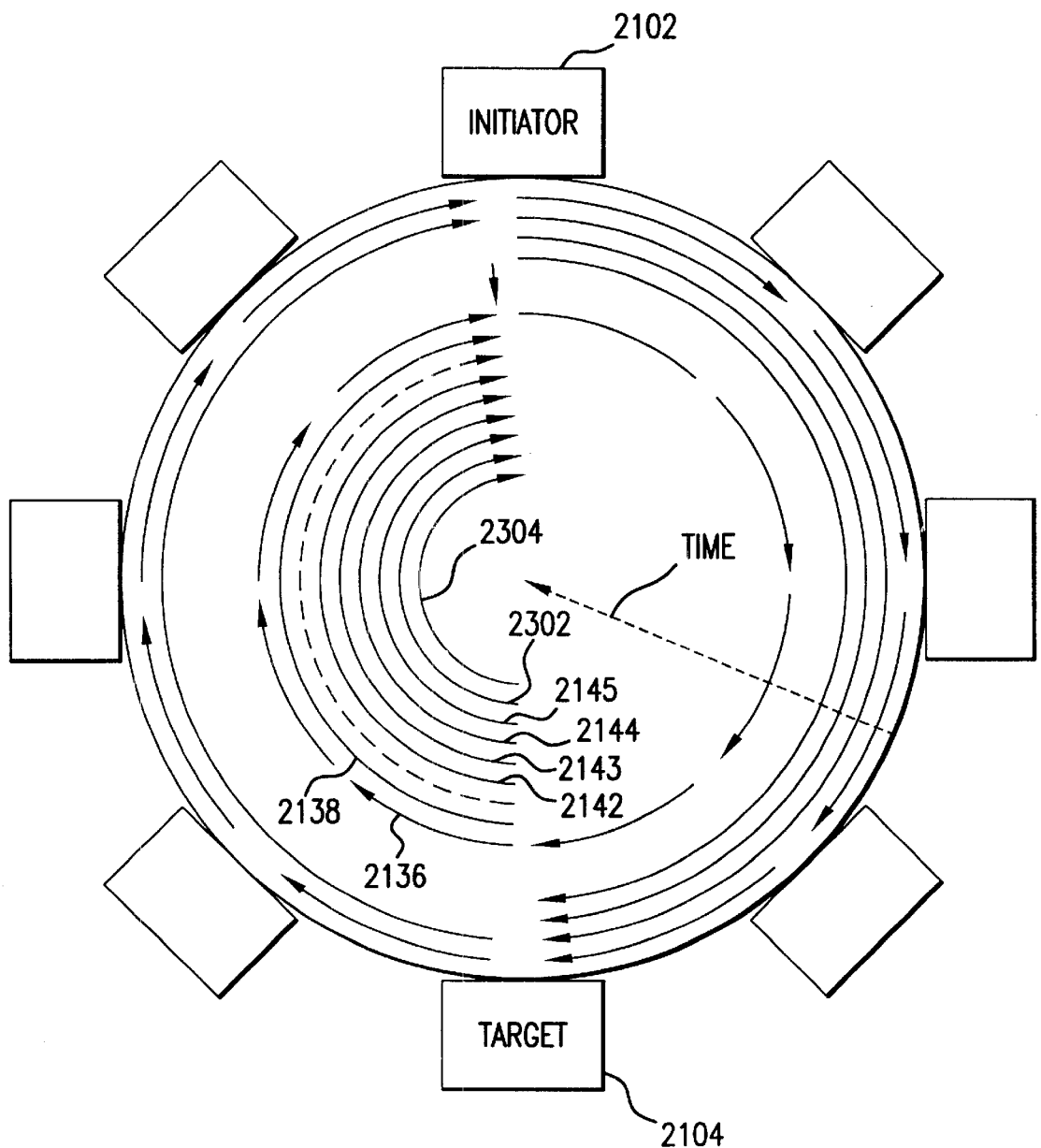
FIG. 23 illustrates the three phases of SCSI read command execution that include an FC Port implemented with the TL.

FIG. 21 illustrates the three phases of SCSI read command execution for an initiator and target interconnected by an FC arbitrated loop topology. In FIG. 21, an initiator FC node 2102 is interconnected with a target FC node 2104 by an FC arbitrated loop 2106. The FC arbitrated loop 2106 includes six additional FC-Nodes 2108–2113. In FIG. 21, FC arbitrated loop primitives and Fibre Channel sequences that are sent from one FC node to another FC node during execution of a SCSI read operation are shown as arrows, such as arrow 2114. In FIG. 21, time is a radial axis 2116 directed toward the center of the FIG. 2118. In other words, execution of the SCSI read operation starts towards the outer circumference of the circular portion of the figure and proceeds towards the center of the FIG. 2118. FIGS. 22 and 23 employ the same method of illustration as FIG. 21, and elements of FIG. 22 and 23 that are common with elements of FIG. 21 will not be re-labeled in FIGS. 22–23. FIG. 21 illustrates the execution of an SCSI read operation by FC nodes employing one type of currently available FC Port. First, the initiator FC node 2102 sends an FC arbitrated loop arbitration primitive 2120 in order to gain control of the arbitrated loop. Assuming that the FC arbitrated loop 2106 is quiescent and that the initiator now gains control of the loop as quickly as possible, arbitration for control of the FC arbitrated loop by the initiator 2102 involves the receiving and forwarding of the FC arbitrated loop primitive 2120 by each node in the FC arbitrated loop, represented in FIG. 21 by arrows 2122–2124, 2114, and 2125–2127. Next, the initiator FC node 2102 sends an FC arbitrated loop open primitive 2128 to the target FC node 2104 in order to open a channel between the initiator FC node 2102 and the FC target node 2104. Next, the initiator FC node 2102 sends an FCP_CMND sequence 2130 to the FC target node 2104 in order to initiate a read operation by the target FC node 2104. Finally, the initiator FC node 2102 sends an FC arbitrated loop primitive 2132 to close the channel.

At this point, a lapse in time 2134 occurs during which the FC Port of the target FC node 2104 receives the FCP_CMND sequence and passes the FCP_CMND sequence to the host processor of the target FC node 2104. The host processor carries out the requested read operation, and, in certain commonly-available FC Ports, forwards the data to the FC Port for storage within the FC Port. Once the FC Port has received the data requested by the read command, the FC Port begins the second phase of execution of the read operation.

In the second phase of the execution of the read operation, the FC Port of the target FC node 2104 transmits an FC arbitrated loop primitive 2136 that is received and forwarded by the other FC nodes of the FC arbitrated loop topology. Once the target FC node 2104 receives the FC arbitrated loop primitive 2138 back from the last FC node 2110 of the FC arbitrated loop, the FC Port of the target FC node 2104 sends a second FC arbitrated loop primitive 2138 to the initiator FC node 2102 in order to open a channel with that initiator FC node 2102. The FC Port within the target FC node 2104 then optionally sends an FCP_XFER_RDY sequence 2140 to the initiator FC node 2102 (although, in practice, this is rarely done, and is not allowed in many implementations). Next, the FC Port of the target FC node 2104 sends the FC data frames 2142–2145 of the FCP_DATA sequence to the initiator FC node 2102. At this point, in certain currently-available FC Ports, another time lapse 2148 occurs. During this time lapse, the interface controller of the FC Port of the target FC node 2104 interacts with the target node host processor in order to acquire the data for an FCP_RESPONSE sequence. This commonly requires at least a context switch and a significant amount of processing within the host. During this time lapse 2148, the target FC node 2104 maintains control of the FC arbitrated loop 2106 denying access to the FC arbitrated loop to the other FC nodes interconnected by the FC arbitrated loop. This time lapse thus represents a significant decrease of the available throughput of the FC arbitrated loop with respect to the other FC nodes of the FC arbitrated loop. Note also that the time intervals 2134 and 2148 are not drawn to scale with regard to the time required for the various FC arbitrated loop primitives and FCP sequences to be transferred. Thus, time intervals 2134 and 2148 may, in reality, be far larger than they appear in FIG. 21. Finally, when the FC Port of the target FC node 2104 has acquired the FCP_RESPONSE sequence data from the host processor, the FC Port of the target FC node 2104 sends the FCP_RESPONSE sequence 2150 to the initiator FC node 2102. Finally, the FC Port of the target FC node 2104 sends an FC arbitrated loop primitive 2152 to close the channel between the target FC node 2104 and the initiator FC node 2102.

FIG. 22 illustrates the three phases of SCSI read command execution for another type of currently available FC Port. The sequence of events in FIG. 22 up through the sending by the target FC node 2104 of the final FC data frame 2145 is identical with the sequence of events illustrated in FIG. 21, and will not be described again. However, in the case of this second type of currently available FC Port, the remaining events are somewhat different. After sending the final FC data frame 2145 to the initiator FC node 2102, the FC Port within the target FC node 2104 sends an FC arbitrated loop completion primitive 2102 to the initiator FC node 2102 in order to close the channel between the target FC node 2104 and the initiator FC node 2102. Then, a time interval 2204 occurs while the FC Port within the target FC node 2104 acquires the FCP_RESPONSE sequence from the host processor of the target FC node 2104. Unlike the analogous interval 2148 in FIG. 21, access to the FC arbitrated loop during this interval 2204 is not prevented, since the target FC node 2104 has given up control of the FC arbitrated loop. When the FC Port within the target FC node 2104 is ready to send the FCP_RESPONSE sequence to the initiator FC node 2102, the FC Port within the target FC node 2104 sends out an FC arbitrated loop primitive 2206 in order to gain control of the FC arbitrated loop. Once control has been gained, the FC Port sends an FC arbitrated loop primitive 2208 to the initiator FC node 2102 in order to open an channel between the target FC node 2104 and the initiator FC node 2102, then sends the FCP_RESPONSE sequence 2210 to the initiator FC node 2102, and finally sends an FC arbitrated loop primitive 2212 to the initiator FC node 2102 in order to close the channel between the target FC node 2104 and the initiator FC node 2102.

Although the second type of FC Port does not maintain control over the FC arbitrated loop during the second time interval 2204, this second type of FC Port must arbitrate twice for control of the FC arbitrated loop in order to complete execution of the read command. In FIGS. 21–23, arbitration is represented as the receiving and forwarding of an FC arbitrated loop primitive by all the nodes of the FC arbitrated loop. However, arbitration may be a far more lengthy process. If more than one node is contending for control of the FC arbitrated loop, an FC loop may need to repeatedly attempt to gain control of the FC arbitrated loop following lengthy intervals during which other FC nodes gain control of the FC arbitrated loop and conduct an exchange of data. A second arbitration by the FC Port of the target FC node 2104 may greatly increase the I/O latency of the execution of the read command.

FIG. 23 illustrates the three phases of SCSI read command execution that include an FC Port implemented with the TL. In FIG. 23, the events up through sending by the TL within the target FC node 2104 of the final FC data frame 2145 are identical to the events in FIGS. 21–22, and will not be again described. After sending of the final FC data frame 2145, an FC Port implemented using a TL does not require an additional time interval, like time intervals 2148 in FIG. 21 and 2204 in FIG. 22. Instead, the FCP_RESPONSE has already been prepared by the host within the target FC node 2104 and a reference to the prepared FCP_RESPONSE sequence has been passed by the host processor to the TL at the same time that the host processor passed the read data to the TL returned by the TL in FC data frames 2142–2145. Therefore, the TL can immediately send the FCP_RESPONSE sequence 2302 to the initiator FC node 2102 and then send an FC arbitrated loop primitive 2304 to close the channel between the target FC node 2104 and the initiator FC node 2102. Thus, the method of the present invention incorporated in the TL eliminates the second time interval incurred by currently available FC Ports (2148 in FIG. 21 and 2204 in FIG. 22) and eliminates the need for a second loop arbitration required by the second type of currently FC Port illustrated in FIG. 22. The TL avoids unnecessary degradation of the throughput of the FC arbitrated loop due to an interval during which control is maintained by the FC Port during which no data is exchanged (2148 in FIG. 21) and eliminates a source of a potentially large increased I/O latency caused by a second arbitration (as illustrated in FIG. 22).

Implementation Of The Present Invention

Figure 24:
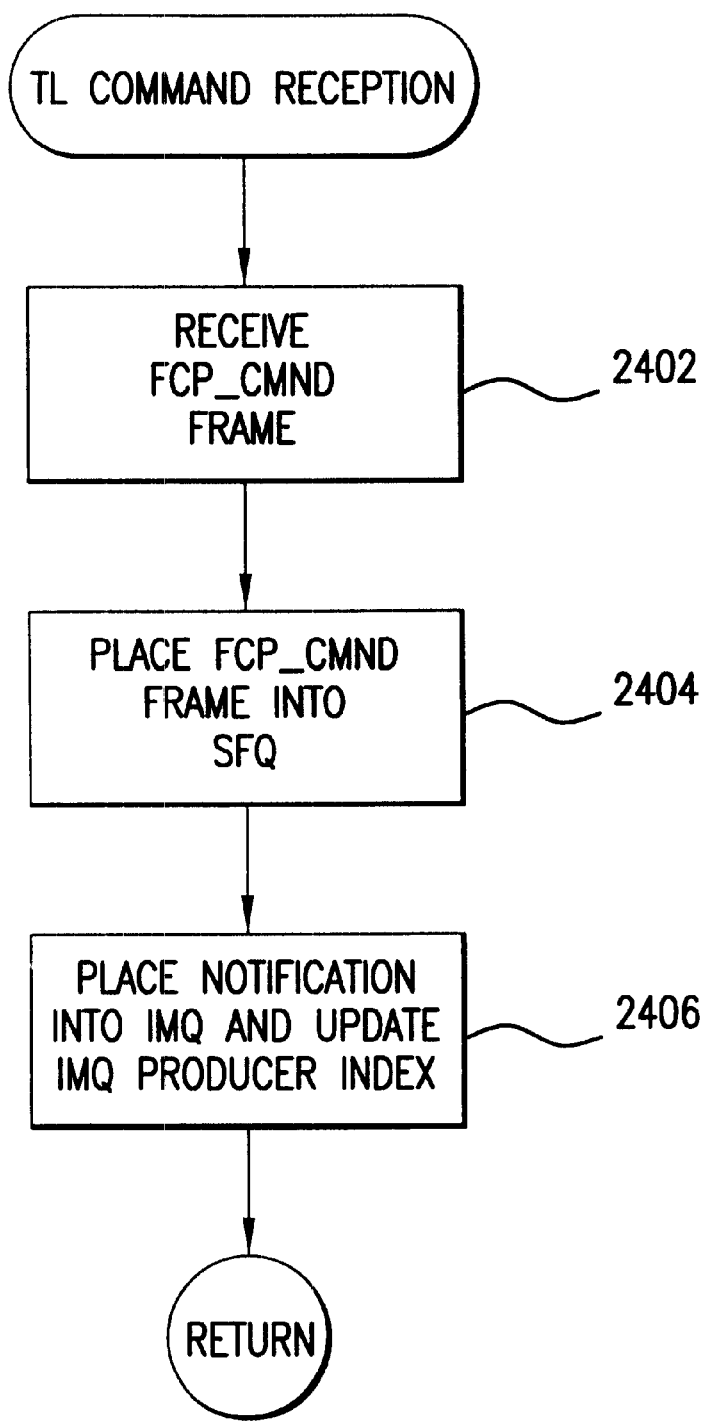
FIG. 24 illustrates the steps involved in the reception of an FCP_CMND sequence representing a read operation from an initiating node.
Figure 25:
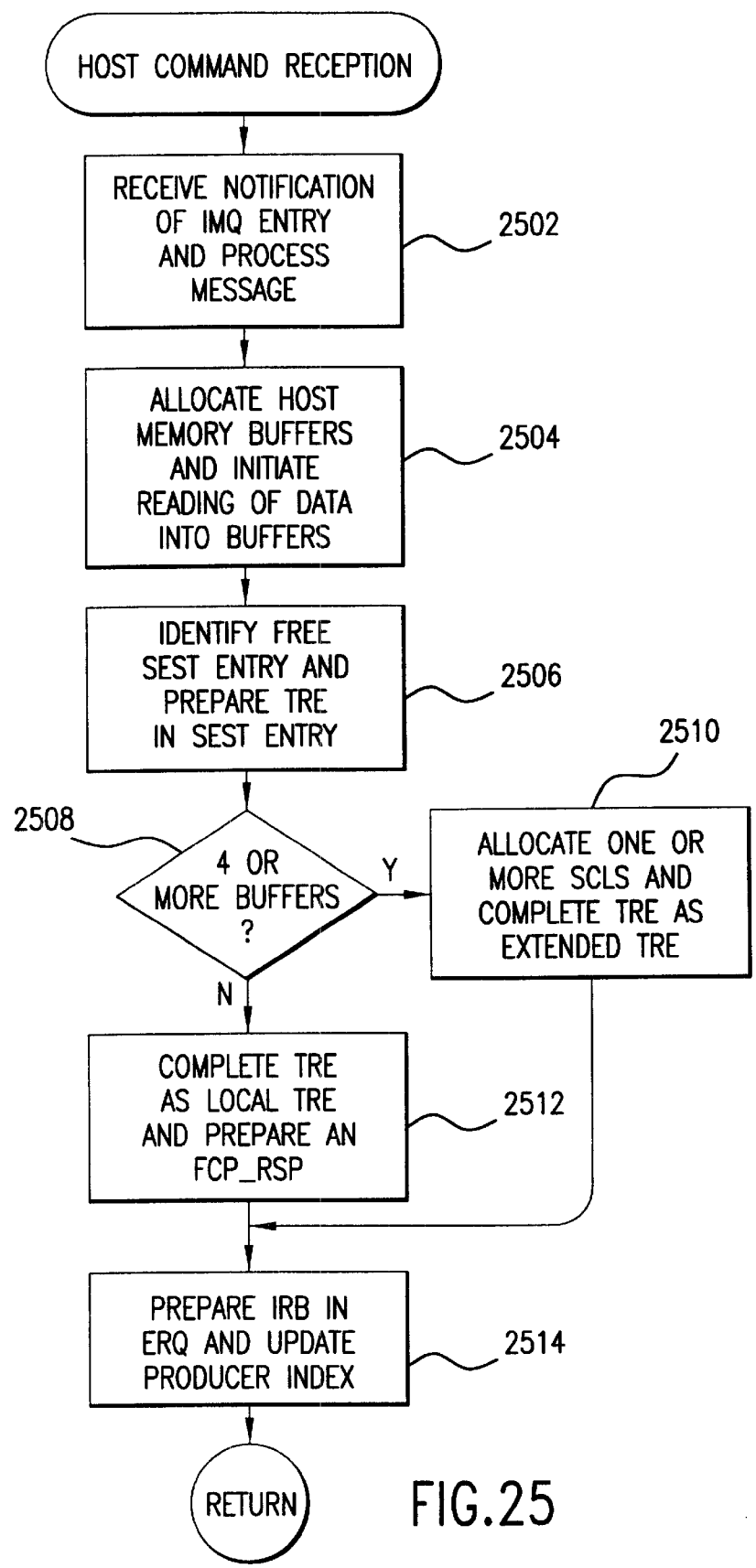
FIG. 25 illustrates the steps taken by the host to process a received FCP_CMND frame.
Figure 26:
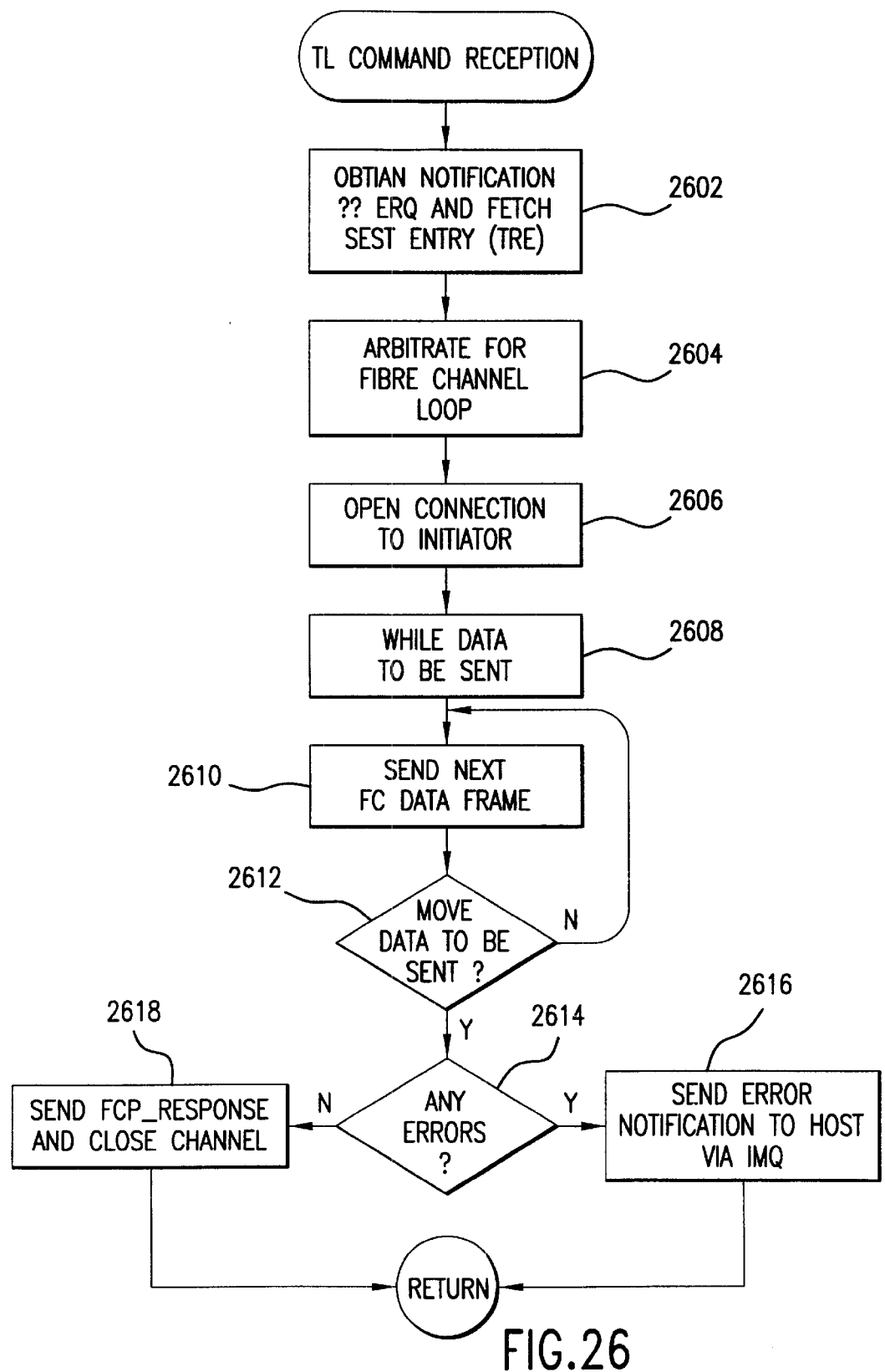
FIG. 26 illustrates the steps involved in the sending of the requested read data by the TL to the initiator of the read command.

FIGS. 24–26 are flow control diagrams that illustrate implementation of the present invention by the TL and the host processor of the FC node that includes an FC Port in which the TL resides. FIG. 24 illustrates the steps involved in the reception of an FCP_CMND sequence representing a read operation from an initiating node. In step 2402, the FCP_CMND sequence, in this case a single FC frame, is received by the frame manager component of the TL (914 in FIG. 9). In step 2404, the TL processes the received FCP_CMND frame by placing the FCP_CMND frame into the SFQ (903 in FIG. 9). Finally, in step 2406, the TL places a message into the IMQ (902 in FIG. 9) and updates the IMQ producer index in order to signal the host processor so that the host processor can process the FCP_CMND frame.

FIG. 25 illustrates the steps taken by the host processor to process a received FCP_CMND frame. In step 2502, the host processor is notified of the appearance of a message in the IMQ (902 in FIG. 9) and begins processing the message. In step 2504, the host processor allocates memory buffers and begins reading the data requested in the FCP_CMND sequence into the allocated memory buffers. In step 2506, the host processor identifies a free entry in the SEST (904 in FIG. 9) and begins to prepare a TRE (1702 in FIG. 17 and 1808 in FIG. 18) in the free SEST entry. If there are four or more memory buffers that contain the requested read data, as detected by the host in step 2508, the host allocates one or more SGLs (1712 and 1714 in FIG. 17), places references to the host memory buffers into the SGLs, and completes the TRE as an extended TRE (1702 in FIG. 17). Otherwise, in step 2512, the host places references to the host memory buffers into the TRE itself and completes the TRE as a local TRE (1806 in FIG. 18). The host prepares an FCP_RSP, as well, and links it to the TRE. Finally, in step 2514, the host prepares an IRB (716 in FIG. 17 and 1810 in FIG. 18) in an empty slot of the ERQ (905 in FIG. 9) and updates the producer index of the ERQ in order to notify the TL that the appropriate data has been assembled in order to complete the requested read operation.

FIG. 26 illustrates the steps involved in the sending of the requested read data by the TL to the initiator of the read command. In step 2602, the TL is notified of a new entry in the ERQ (905 in FIG. 9) and reads that entry in order to determine the SEST entry (904 in FIG. 9) that contains the TRE prepared by the host to describe the read data to be returned to the initiator. The SEM-OUT (932 in FIG. 9) component of the TL creates an outbound descriptor block ("ODB") that is passed to the outbound sequence manager (930 in FIG. 9) that coordinates execution of the remaining steps in FIG. 26. In step 2604, the TL arbitrates for control of the FC arbitrated loop (2136 in FIG. 23). In step 2606, the TL opens a connection to the initiator (2138 in FIG. 23). In the while-loop composed of steps 2608, 2610, and 2612, the TL uses the references to host memory buffers contained in the ODB in order to locate the read data to be returned and returns the read data in one or more FC data frames (2142–2145 in FIG. 23). If any errors have occurred during the return of the read data, as determined by the TL in step 2614, the TL notifies the host processor of the occurrence of an error via a control register in order to afford the host processor an opportunity to intervene in order to ameliorate any error conditions or to possibly repeat data transmission of one or more FC frames to the initiator in step 2616. Thus, in the case of the occurrence of an error, the FCP_RSP sequence is not sent automatically by the TL. Otherwise, in step 2618, the TL sends the FCP_RESPONSE sequence (2302 in FIG. 23) to the initiator and closes the channel to the initiator(2304 in FIG. 23). The TL can send the FCP_RSP sequence without host intervention, because the data for the FCP_RSP was prepared earlier by the host (step 2512 in FIG. 25) and linked to the TRE fetched by the TL in step 2602.

Figure 27:
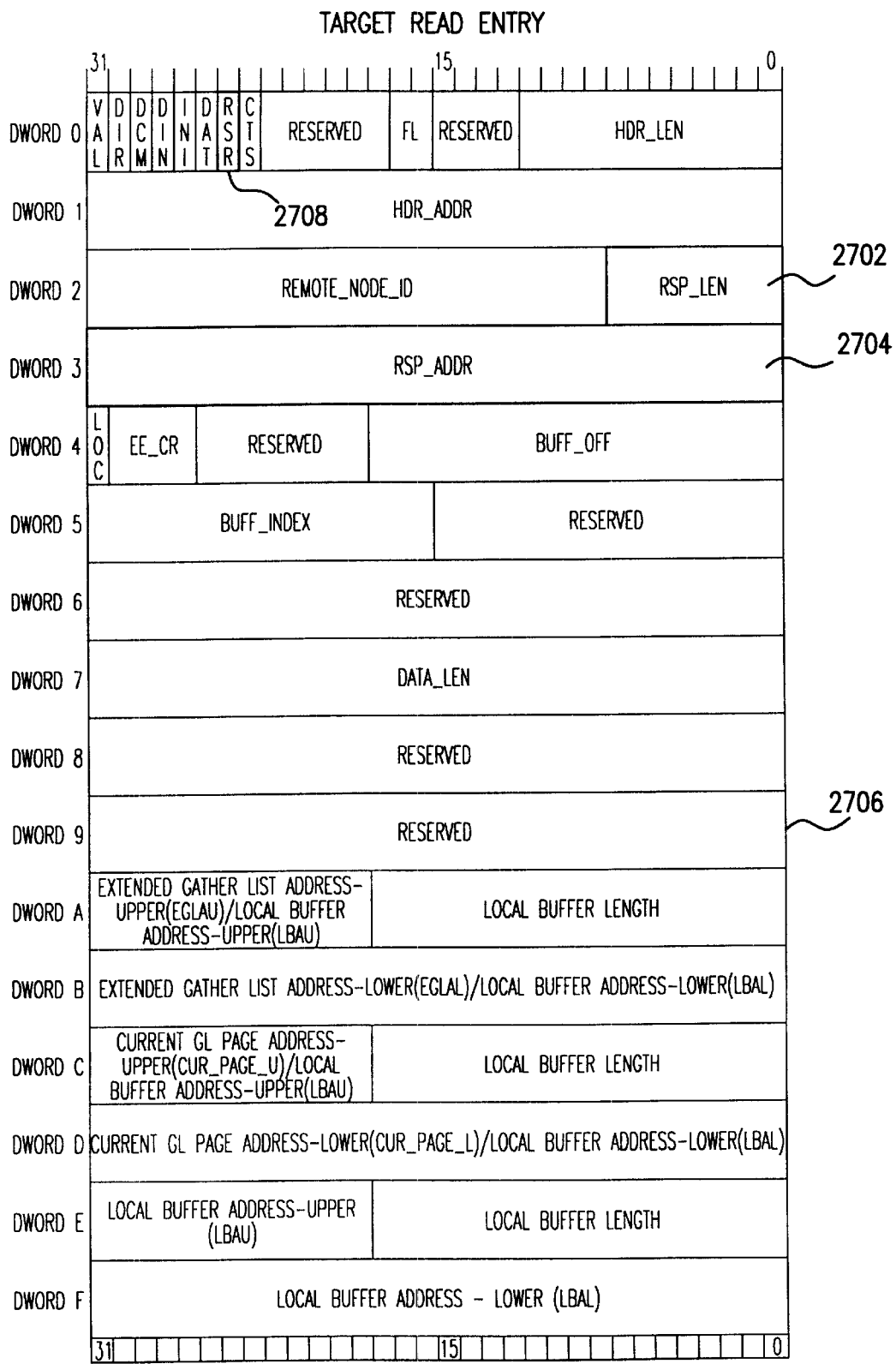
FIG. 27 shows an expanded view of a TRE shown in FIG. 17–18.

FIG. 27 shows an expanded view of a TRE shown in FIG. 17–18. When a host includes the FCP_RESPONSE along with the data to be returned in the FCP_DATA sequence by the method of the present invention, the host places a description of the size and location of a data structure containing information for preparing the FCP_RESPONSE sequence data into the RSP_Len field 2702, and the RSP_Addr field 2704 of the TRE 2706. The host also sets the RSP flag 2708 to indicate to the TL that data for the FCP_RESPONSE sequence is included. FIG. 28 illustrates the ODB that is prepared internally by the TL in order to return both the FCP_DATA sequence and the FCP_RESPONSE sequence to the initiator following a single arbitration for control of the FC arbitrated loop.

Although the present invention has been described in terms of a particular embodiment, it is not intended that the invention be limited to this embodiment. Modifications within the spirit of the invention will be apparent to those skilled in the art. For example, a different number of data structures containing a different number of data fields may be used to store references to the host memory buffers containing data for the FCP_DATA sequence and the data structure containing information for preparing the FCP_

RESPONSE sequence. The exact sequence of steps illustrated in FIGS. 24–26 may vary and the state machines within the TL that implement the present invention may be specified in any number of specification languages in order to be transformed into hardware state machines of many different types of construction.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. An interface controller that operates along with a host processor and a host memory within a target node to implement a number of network communications protocol layers, the interface controller coupled to a receiver and transmitter that are, in turn, coupled to a communications network transport medium through which the receiver receives a read command sequence from an initiator node and through which the transmitter returns a data sequence and a response sequence to the initiator node, the data sequence composed of a number of data frames that contain data, the interface controller comprising:

an interrupt facility by which the interface controller notifies the host processor that the interface controller has received a read command sequence and placed the received read command sequence in the host memory;

a control register that notifies the interface controller that the host processor has prepared a data structure in the host memory, in response to reception of the read command sequence, that represents the data sequence and the response sequence prepared by the host for return to the initiator node; and a logic component that processes the data structure by transmitting the data sequence and response sequence described by the data structure to the initiator node.

2. The interface controller of claim 1 wherein the data structure contains a number of pointers to a number of host memory buffers that contain the data to be returned by the interface controller to the initiator node and wherein the data structure contains a pointer to a data structure in host memory that describes the response sequence to be sent by the interface controller to the initiator node.

3. The interface controller of claim 2 used to implement a Fibre Channel port, wherein the data sequence is a Fibre Channel sequence composed of a number of Fibre Channel data frames.

4. The interface controller of claim 3 wherein the read sequence is a Fibre Channel protocol command sequence, wherein the data sequence is a Fibre Channel protocol data sequence, and wherein the response sequence is a Fibre Channel protocol response sequence.

5. The interface controller of claim 4 wherein the read command sequence encapsulates a small computer systems interface protocol read operation command directed by the initiator to the target.

6. A method for processing read command sequence received by an interface controller from an initiator node according to a network communications protocol, the interface controller used to implement a network communications port within a target node that also contains a host processor and a host memory, the method comprising:

receiving from the initiator node a read command sequence representing a read command;

arbitrating for and gaining control of the communications network;

sending the data sequence to the initiator node; and immediately after sending the data sequence to the initiator node, sending the response sequence to the initiator node without a second arbitration for control of the communications network.

7. The method of claim 6 further including:

receiving from the initiator node a read command sequence representing a read command and before arbitrating for and gaining control of the communications network;

placing the received read command sequence into the host memory;

allocating host memory buffers for the data to be returned by the target node in response to receiving the read command;

placing data into the host memory buffers;

placing data for the response sequence into a response sequence data structure in host memory; and preparing a data structure to reference the host memory buffers and to reference the data structure holding data for the response sequence.

8. The method of claim 7 wherein the network communications protocol is the Fibre Channel protocol and wherein the interface controller is used to implement a Fibre Channel network communications port.

9. The method of claim 8 wherein the initiator node and the target node are both interconnected via a Fibre Channel arbitrated loop.

10. A data structure allocated by a host processor within a first communications network node to specify, to an interface controller within the first communications network node, execution of a target read operation received by the communications network node from a second communications network node, the data structure comprising:

a number of host memory buffer references that indicate where in host memory the data to be transmitted to the second communications network node is located; and a reference to an auxiliary data structure that includes a specification, also stored in host memory, for transmitting a response message to the second communications network node following transmission of the data.

* * * * *